(12) United States Patent  
Rivera

(10) Patent No.: US 12,185,867 B2  
(45) Date of Patent: Jan. 7, 2025

(54) BEVERAGE BREWER SPRAY APPARATUS HAVING ACCOMMODATION FOR MULTIPLE DISPERSION MEMBERS

(71) Applicant: Adrian Rivera, Whittier, CA (US)

(72) Inventor: Adrian Rivera, Whittier, CA (US)

(*) Notice: Subject to any disclaimer, the term of this patent is extended or adjusted under 35 U.S.C. 154(b) by 188 days.

(21) Appl. No.: 17/197,513

(22) Filed: Mar. 10, 2021

(65) Prior Publication Data

US 2021/0274960 A1 Sep. 9, 2021

Related U.S. Application Data

(63) Continuation-in-part of application No. 17/110,260, filed on Dec. 2, 2020, and a continuation-in-part of application No. 16/885,261, filed on May 27, 2020, and a continuation-in-part of application No. 15/191,259, filed on Jun. 23, 2016, now Pat. No. 10,702,096.

(60) Provisional application No. 62/249,009, filed on Oct. 30, 2015.

(51) Int. Cl.
*A47J 31/44* (2006.01)
*A47J 31/057* (2006.01)
*A47J 31/60* (2006.01)

(52) U.S. Cl.
CPC ......... *A47J 31/4475* (2013.01); *A47J 31/057* (2013.01); *A47J 31/4407* (2013.01); *A47J 31/60* (2013.01)

(58) Field of Classification Search
CPC .... A47J 31/4475; A47J 31/60; A47J 31/4407; A47J 31/057
See application file for complete search history.

(56) References Cited

U.S. PATENT DOCUMENTS

| | | | |
|---|---|---|---|
| 4,748,901 A | 6/1988 | Burmeister | |
| 5,230,278 A | 7/1993 | Bunn et al. | |
| 5,325,765 A | 7/1994 | Sylvan et al. | |
| 5,398,596 A | 3/1995 | Fond | |
| 5,931,329 A * | 8/1999 | Wu | A47J 31/4482 220/233 |

(Continued)

FOREIGN PATENT DOCUMENTS

| | | |
|---|---|---|
| CN | 201481108 U | 5/2010 |
| CN | 201822645 U | 5/2011 |

(Continued)

*Primary Examiner* — Michael Collins
(74) *Attorney, Agent, or Firm* — IP Strategies

(57) ABSTRACT

A beverage brewer spray apparatus includes a lid, one or more dispersal members, and a skirt. The lid has obverse and converse surfaces, with at least one recessed region in the obverse surface. The dispersal members extend from the converse surface at open proximal ends. The skirt has a proximal end fixed to and extending outward from the converse surface of the lid. Each dispersal member has a sidewall and a distal end defining an interior of the dispersal member. The sidewall has apertures arranged in a distal section of the sidewall. The lid has through-holes formed between the obverse and converse surfaces, and the dispersal members are fixed to the converse surface such that the through-holes provide fluid communication from the obverse surface of the lid to the apertures through the interiors of the dispersal members. The apertures are configured to direct liquid outward from the dispersal members.

8 Claims, 20 Drawing Sheets

(56) References Cited

U.S. PATENT DOCUMENTS

| | | | |
|---|---|---|---|
| 6,047,859 A * | 4/2000 | Schroeder | B67D 1/0044 |
| | | | 222/145.5 |
| 6,990,891 B2 * | 1/2006 | Tebo, Jr. | A47J 31/4496 |
| | | | 99/302 R |
| 7,059,239 B2 | 6/2006 | Balkau | |
| 7,093,533 B2 * | 8/2006 | Tebo, Jr. | A47J 31/368 |
| | | | 99/300 |
| 7,509,908 B1 | 3/2009 | Assota et al. | |
| 7,578,415 B2 * | 8/2009 | Ziesel | B67D 1/0085 |
| | | | 222/129.1 |
| 7,673,558 B2 | 3/2010 | Panesar | |
| 7,703,381 B2 * | 4/2010 | Liverani | A47J 31/3695 |
| | | | 99/302 R |
| 8,047,127 B2 * | 11/2011 | Lin | A47J 31/469 |
| | | | 99/302 R |
| 8,162,177 B2 * | 4/2012 | Ziesel | B67D 1/0021 |
| | | | 222/145.5 |
| 8,361,527 B2 | 1/2013 | Winkler et al. | |
| 8,720,320 B1 * | 5/2014 | Rivera | A47J 31/0678 |
| | | | 99/295 |
| 8,807,392 B2 * | 8/2014 | Smeller | B67D 1/0044 |
| | | | 239/419 |
| 8,986,764 B2 | 3/2015 | Yoakim et al. | |
| 9,113,747 B2 * | 8/2015 | Rivera | A47J 31/0647 |
| 9,402,501 B1 * | 8/2016 | Vu | A47J 31/407 |
| 9,555,957 B2 | 1/2017 | Winkler et al. | |
| 9,730,551 B2 | 8/2017 | Douglas et al. | |
| 9,731,892 B2 | 8/2017 | Yoakim et al. | |
| 9,756,974 B2 * | 9/2017 | Rivera | A47J 31/06 |
| 9,795,243 B2 * | 10/2017 | Rivera | B65B 67/02 |
| 9,968,111 B2 | 5/2018 | Yoakim et al. | |
| 10,035,645 B2 | 7/2018 | Schroeder | |
| 10,071,851 B2 | 9/2018 | Vu | |
| 10,702,096 B2 | 7/2020 | Rivera | |
| 11,013,365 B2 | 5/2021 | Short | |
| 11,053,110 B2 * | 7/2021 | Lazatin | B67D 1/0021 |
| 11,638,499 B2 * | 5/2023 | Rivera | A47J 31/057 |
| | | | 99/279 |
| 11,730,307 B2 * | 8/2023 | Sasena | A47J 31/0689 |
| | | | 99/295 |
| 11,745,996 B1 * | 9/2023 | Zbedlick | B67D 1/1277 |
| | | | 222/544 |
| 2007/0157821 A1 * | 7/2007 | Panesar | A47J 31/0673 |
| | | | 99/279 |
| 2007/0175334 A1 | 8/2007 | Halliday et al. | |
| 2007/0175335 A1 | 8/2007 | Liverani et al. | |
| 2007/0259074 A1 * | 11/2007 | Searchilli | B65D 85/8061 |
| | | | 426/78 |
| 2008/0223218 A1 | 9/2008 | Magg et al. | |
| 2009/0004335 A1 | 1/2009 | MacMahon et al. | |
| 2009/0229470 A1 | 9/2009 | Dorfmueller | |
| 2009/0230149 A1 * | 9/2009 | Smeller | B67D 1/0024 |
| | | | 222/145.5 |
| 2010/0229729 A1 | 9/2010 | Garcia et al. | |
| 2010/0251899 A1 * | 10/2010 | Lin | A47J 31/469 |
| | | | 99/284 |
| 2011/0076361 A1 | 3/2011 | Peterson et al. | |
| 2011/0081466 A1 | 4/2011 | Lassota | |
| 2012/0058226 A1 | 3/2012 | Winkler et al. | |
| 2012/0207895 A1 | 8/2012 | Rivera | |
| 2012/0285330 A1 * | 11/2012 | Demiglio | A47J 31/0689 |
| | | | 99/279 |
| 2012/0285334 A1 | 11/2012 | DeMiglio et al. | |
| 2013/0014648 A1 | 1/2013 | Rognon | |
| 2013/0017303 A1 * | 1/2013 | Vu | A47J 31/0689 |
| | | | 426/433 |
| 2013/0323381 A1 | 12/2013 | Dakis | |
| 2014/0290493 A1 * | 10/2014 | Rivera | A47J 31/407 |
| | | | 99/295 |
| 2015/0034127 A1 | 2/2015 | Talon | |
| 2015/0068404 A1 * | 3/2015 | Rivera | A47J 31/4492 |
| | | | 99/323 |
| 2015/0090300 A1 | 4/2015 | Dyer | |
| 2015/0150412 A1 | 6/2015 | Heitele | |
| 2016/0016727 A1 | 1/2016 | Katz | |
| 2016/0045063 A1 | 2/2016 | Mantle et al. | |
| 2016/0137402 A1 | 5/2016 | Talon et al. | |
| 2016/0145037 A1 | 5/2016 | Trombley | |
| 2016/0213194 A1 * | 7/2016 | Webster | A47J 31/50 |
| 2016/0227958 A1 * | 8/2016 | Zhao | A47J 31/18 |
| 2017/0027376 A1 * | 2/2017 | Vu | A47J 31/0689 |
| 2017/0190451 A1 | 7/2017 | van der Vliet et al. | |
| 2018/0220840 A1 | 8/2018 | Vorfeld | |
| 2018/0332995 A1 | 11/2018 | Rapparini et al. | |
| 2019/0000262 A1 * | 1/2019 | Vu | A47J 31/407 |
| 2019/0002193 A1 | 1/2019 | Vu | |
| 2019/0328026 A1 * | 10/2019 | Westra | A23N 12/10 |
| 2021/0127889 A1 * | 5/2021 | Sasena | A47J 31/0689 |

FOREIGN PATENT DOCUMENTS

| | | |
|---|---|---|
| CN | 202396332 U | 8/2012 |
| CN | 103054469 A | 4/2013 |
| CN | 103201197 A | 7/2013 |
| CN | 104884367 A | 9/2015 |
| CN | 204617922 U | 9/2015 |
| JP | 2002223922 A | 8/2002 |
| KR | 20120122619 A | 11/2012 |
| WO | 2006032601 A1 | 3/2006 |
| WO | 2012037409 A1 | 3/2012 |
| WO | 2015123612 A1 | 8/2015 |

\* cited by examiner

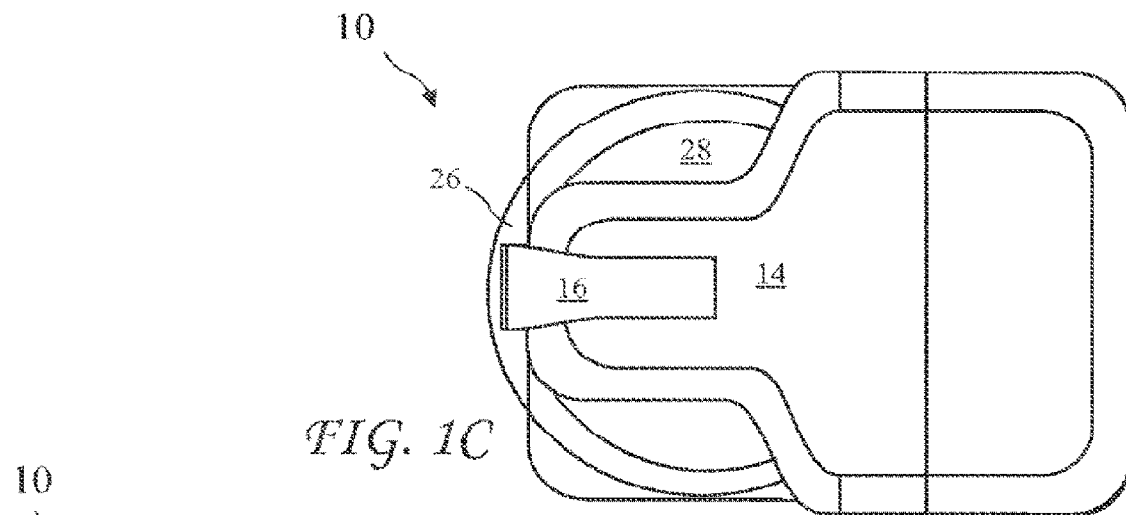
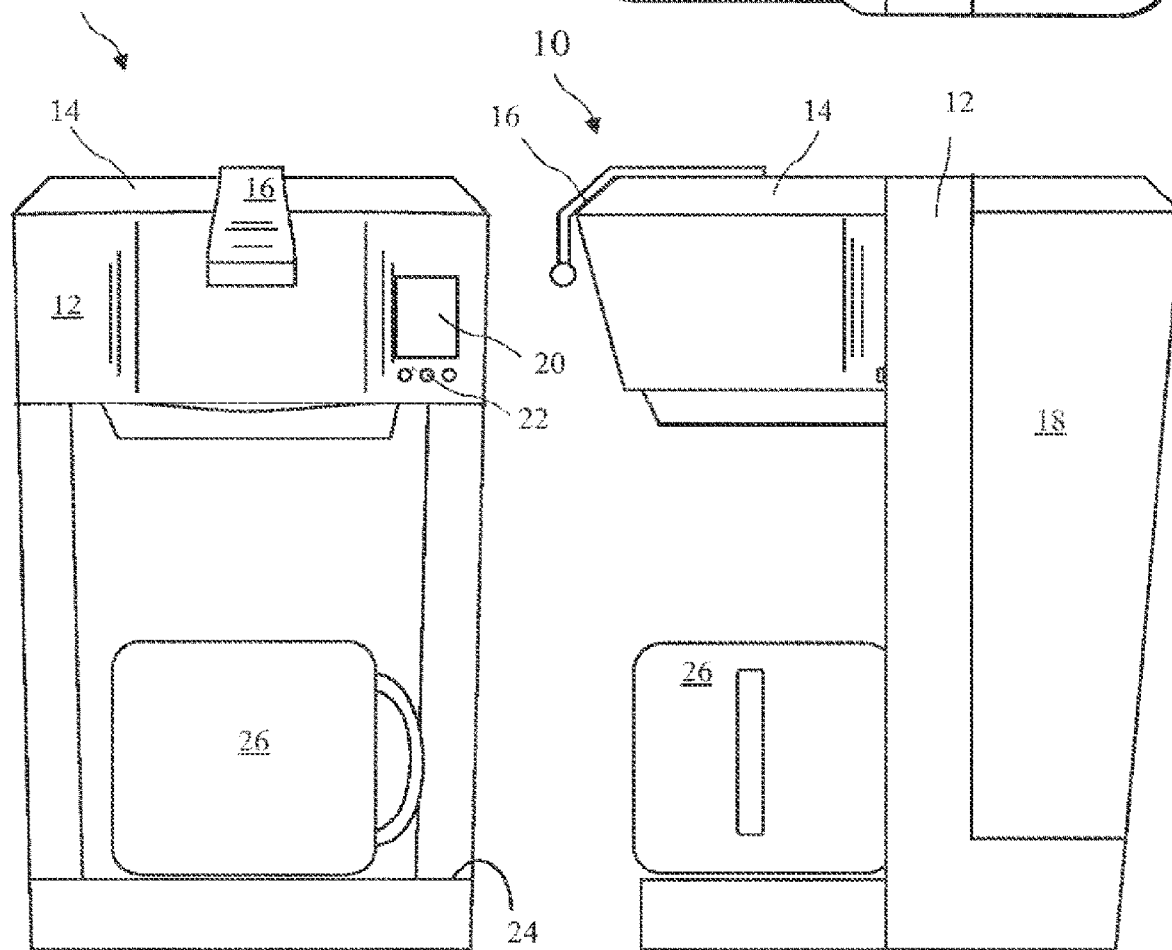
FIG. 1A
FIG. 1B

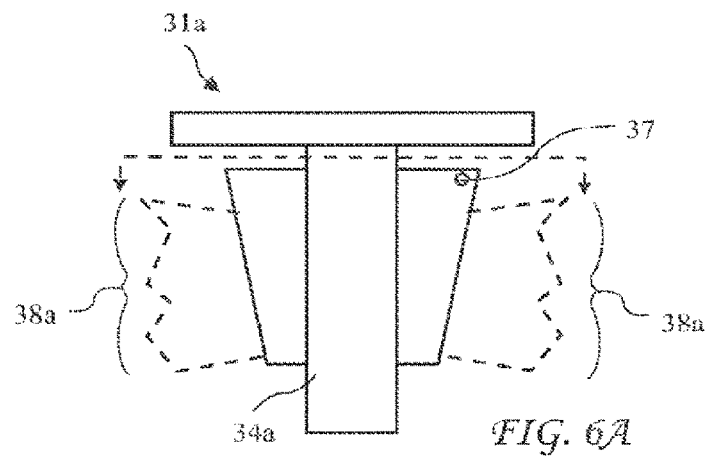
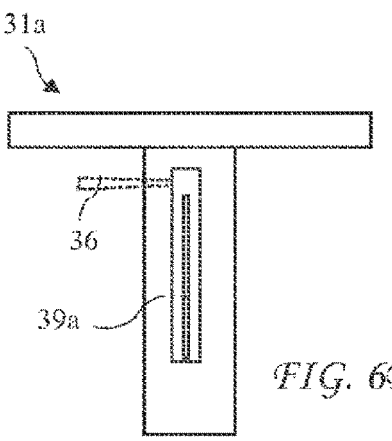
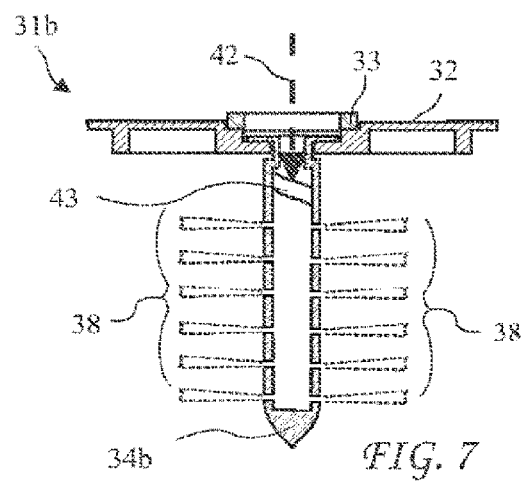
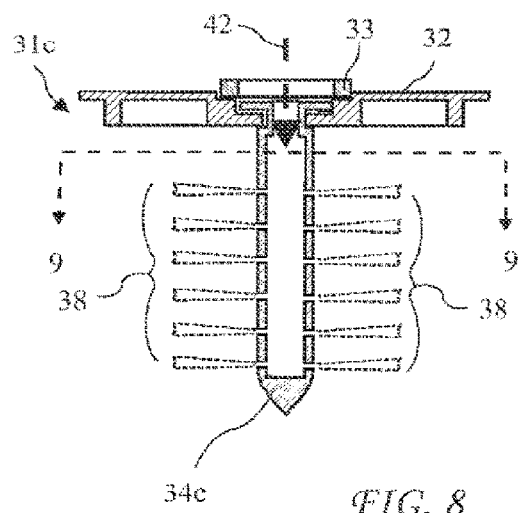
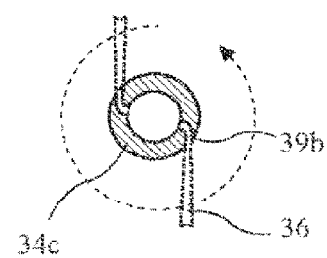

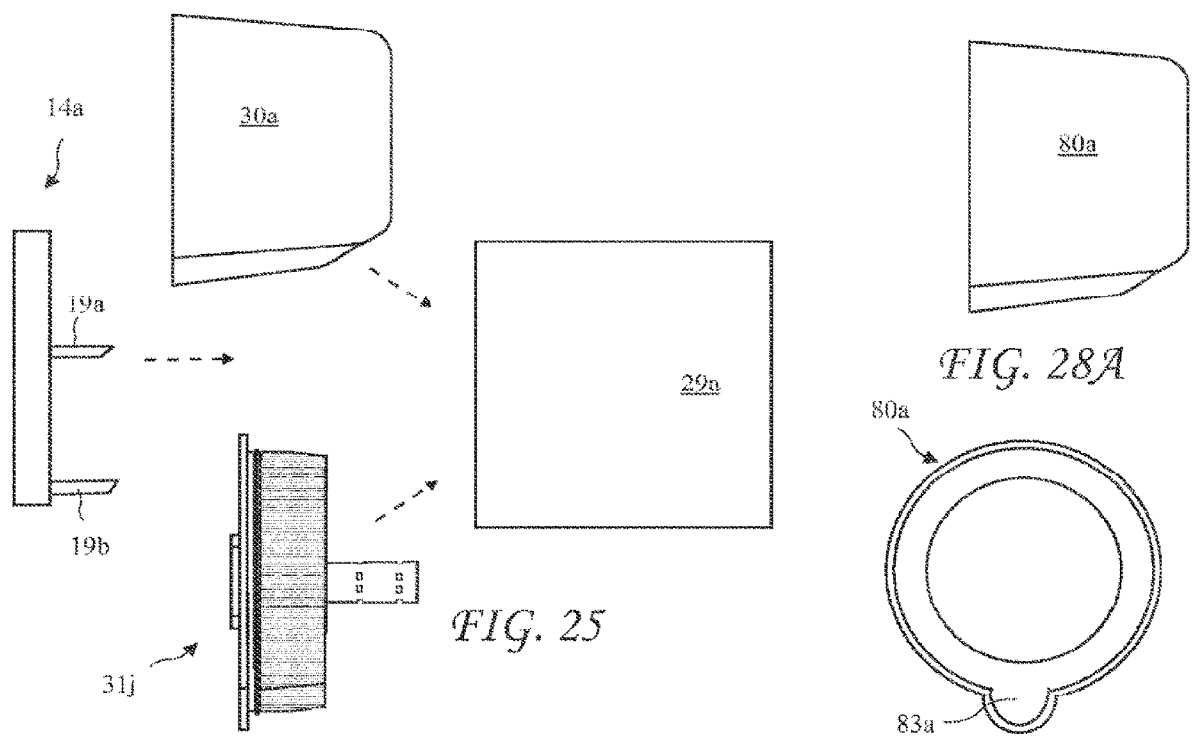
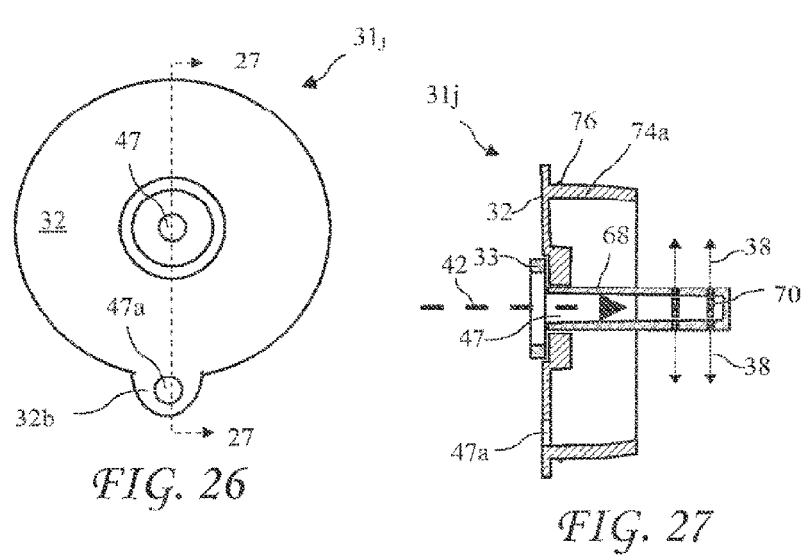

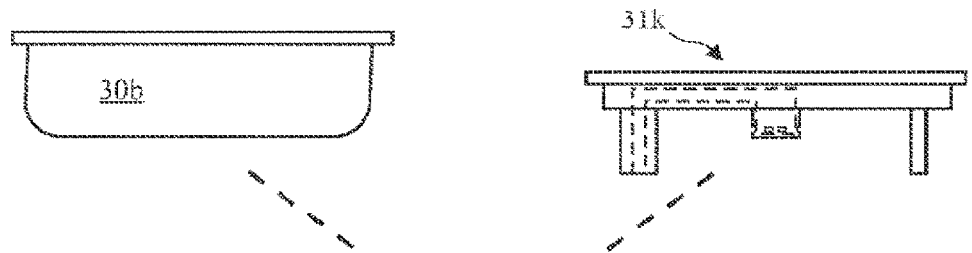
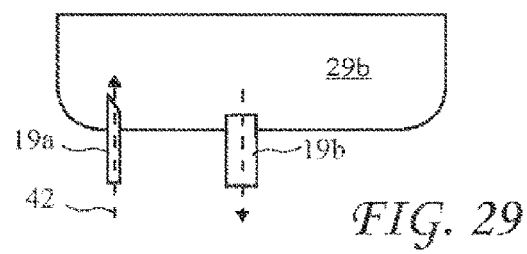
FIG. 29
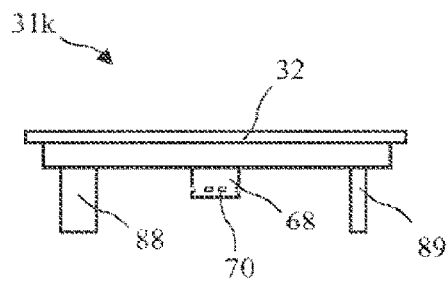
FIG. 30A
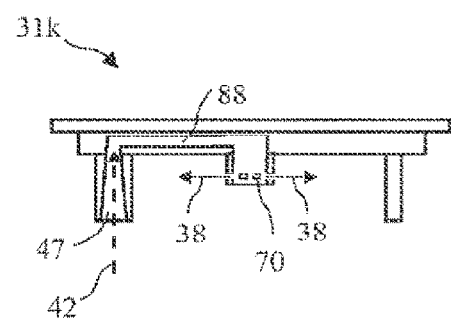
FIG. 31
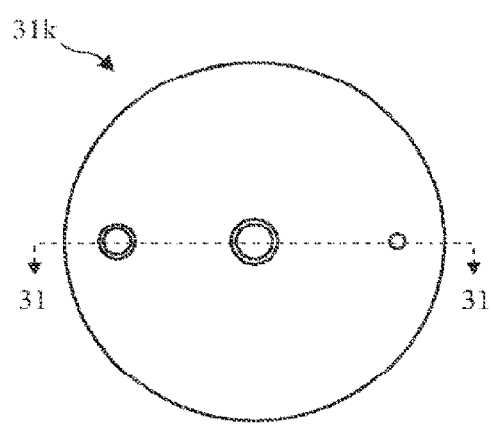
FIG. 30B

BEVERAGE BREWER SPRAY APPARATUS HAVING ACCOMMODATION FOR MULTIPLE DISPERSION MEMBERS

CROSS-REFERENCE TO RELATED APPLICATIONS

This is a continuation-in-part of co-pending U.S. patent application Ser. No. 17/110,260, which was filed on Dec. 2, 2020, which in turn is a continuation-in-part of co-pending U.S. patent application Ser. No. 16/885,261, which was filed on Jun. 27, 2020, which in turn is a continuation-in-part of U.S. patent application Ser. No. 15/191,259, which was filed on Jun. 23, 2016, which in turn is related to and claims priority from U.S. Provisional Application for Patent No. 62/249,009, which was filed on Oct. 30, 2015, the entire disclosures of which are incorporated herein.

FIELD OF THE INVENTION

The invention relates to beverage brewing machines and in particular to apparatus for cleaning elements of a beverage brewing machine.

BACKGROUND OF THE INVENTION

Several types of beverages, such as coffee, espresso, tea, yerba mate, and herbal infusions (tisane), are brewed by infusing or steeping ground or shredded beverage material in water or other liquid. These beverages can also be brewed by using a beverage brewer, or brewing machine. Beverage brewers typically brew a beverage by passing hot or cold water through ground brewing material and collecting the brewed beverage in a container such as mug or carafe. Through continued use, a build-up of beverage residue can accumulate on elements of the brewer. For example, residue can build up on the walls of a brewing chamber, or on any conduit through which the brewed beverage flows from the brewing chamber to the container. This residue can cause clogging of the beverage pathway, can affect the taste of beverages brewed in the brewer, and can foster the growth of bacteria or otherwise provide a less than sanitary environment for making a comestible beverage.

Many elements of a beverage brewer are awkward or difficult to clean or to rinse thoroughly after cleaning, and cleaning of some elements can be time-consuming and require great effort. An apparatus that can be used to clean these elements of a beverage brewer quickly, easily, thoroughly and with little effort by a user would be beneficial.

BRIEF SUMMARY OF THE INVENTION

The present addresses the above and other needs by providing a brewing machine cleaner including an assembly for spraying water or cleaning fluid so as to be directed toward the element of the brewing machine to be cleaned. The assembly can be stationary or moving, such as spinning, and can be used to effectively clean hard-to-reach elements of the brewing machine. Preferably, the cleaning apparatus can be used to clean the brewing machine automatically when in place and the machine is operated as it would be for a normal brewing operation.

According to an aspect of the invention, a beverage brewer spray apparatus includes a lid, a dispersal member, and a skirt. The lid has an obverse surface, a converse surface, and an open peripheral edge. The dispersal member is fixed to and extends from the converse surface of the lid at an open proximal end of the dispersal member. The skirt has a proximal end fixed to and extending outward from the converse surface of the lid at a distance from the dispersal member. The dispersal member has a sidewall and a closed distal end together defining an interior of the dispersal member. The sidewall has a plurality of apertures formed therethrough, arranged in a distal section of the sidewall. The lid has a lid through-hole formed between the obverse surface and the converse surface, and the dispersal member is fixed to the converse surface of the lid such that the lid through-hole provides fluid communication from the obverse surface of the lid to the plurality of apertures through the interior of the dispersal member. The apertures are configured to direct liquid from the interior of the dispersal member generally outward from the dispersal member.

The preferably are substantially compacted in cross-section. For example, the apertures can be substantially round or square in cross-section.

The apertures can be arranged in multiple rows along a length of the dispersal member.

The apertures can be configured within a thickness of the sidewall of the dispersal member to direct liquid from the interior of the dispersal member generally outward from the dispersal member to at least the distance from the dispersal member. For example, the apertures can be configured as to shape and/or angle within the thickness of the sidewall of the dispersal member.

The apertures can be angled within a thickness of the sidewall of the dispersal member so as not to be perpendicular to the sidewall of the dispersal member.

The apertures can be arranged in a distal half of the dispersal member.

The dispersal member can extend from the converse surface of the lid a distance that is farther than a distance that the skirt extends from the converse surface of the lid. The apertures preferably are arranged a distance away from the converse surface of the lid that is farther than a distance that a distal end of the skirt is arranged from the converse surface of the lid.

The obverse surface and the converse surface can be substantially planar and parallel to each other.

The proximal end of the dispersal member can be sealed to the converse surface of the lid at the lid through-hole.

A proximal portion of the skirt can extend from the converse surface of the lid at a substantially right angle and a distal portion of the skirt can taper inward.

The skirt can be fixed to the converse surface of the lid at a distance from the peripheral edge of the lid such that a peripheral portion of the lid extends beyond an outside surface of the skirt, forming a ledge around the skirt. The ledge can be configured to be supported on an outer edge of a brewing chamber, and the skirt can be configured to be arranged within the brewing chamber when the ledge is supported on the outer edge of the brewing chamber. The skirt can be configured to engage a sidewall of the brewing chamber such that the skirt is removably coupled to the brewing chamber such that the lid seals an open end of the brewing chamber.

A distance that the skirt extends outward from the converse surface of the lid is preferably at least half a distance that the dispersal member extends from the converse surface of the lid.

According to another aspect of the invention, a beverage brewer and spray apparatus arrangement includes a beverage brewer, and the beverage brewer spray apparatus. The beverage brewer can include an injection tube, a brewing chamber configured to receive fluid from the injection tube, and an outflow tube configured to receive fluid from the brewing chamber. The skirt can be configured to guide the dispersal member into an open proximal end of the brewing chamber such that the dispersal member is arranged within an interior of the brewing chamber. The lid through-hole can be configured to receive an end of the injection tube such that the dispersal member receives the fluid from the injection tube and disperses the received fluid through the plurality of apertures. The apertures can be configured to direct the fluid generally outward from the dispersal member against a sidewall of the brewing chamber. The outflow tube can be configured to receive the dispersed fluid from the brewing chamber.

The apertures can be configured as to at least one of shape and angle within a thickness of the sidewall of the dispersal member.

The skirt can be configured to engage a sidewall of the brewing chamber such that the skirt is removably coupled to the brewing chamber such that the lid seals an open end of the brewing chamber.

The beverage brewer spray apparatus can also include a container made of fluid-impermeable material. The container can include a distal wall, a sidewall, and an open proximal end. The sidewall is fixed at a distal edge to a periphery of the distal wall such that inner surfaces of the distal wall and sidewall define an interior. The open proximal end is defined by a proximal edge of the sidewall. The skirt and the container are configured to mutually engage such that the open proximal end of the container is removably coupled to the skirt such that the lid seals the open proximal end of the container. The inner surface of the container sidewall has no openings.

The skirt and the container can be configured to mutually engage such that an outside surface of the open proximal end of the container is removably coupled to an inside surface of the skirt such that the lid seals the open proximal end of the container. The skirt can be configured to engage a sidewall of the brewing chamber such that an outside surface of the skirt is removably coupled to the brewing chamber such that the lid seals an open end of the brewing chamber.

The container sidewall preferably has a substantially uniform height.

An outer surface of the distal wall can be flat and can define an outer boundary of the container.

The distal wall can be made of rubber.

The distal wall of the container can include an unobstructed container through-hole. Preferably, the container through-hole and the open proximal end of the container are the only openings in the surface of the interior of the container.

The container through-hole can be configured to accommodate the outflow tube such that at least an end of the outflow tube is disposed within the interior of the container to receive the dispersed fluid from the brewing chamber.

The outflow tube can be configured to pierce the distal wall of the container such that at least an end of the outflow tube is disposed within the interior of the container to receive the dispersed fluid from the brewing chamber.

An outer surface of the skirt and a surface of the interior of the container can be configured for mutual sliding engagement so that the container is removably coupled to the skirt such that the dispersal member is disposed in the interior of the container.

The outer surface of the skirt can include scoring to provide a friction fit for mutual sliding engagement.

The outer surface of the skirt can include an annular raised portion and the surface of the interior of the container includes a corresponding annular recessed portion to provide mutual sliding positive engagement.

According to another aspect of the invention, a beverage brewer spray apparatus includes a lid, at least one dispersal member, and a skirt. The lid has an obverse surface, a converse surface, and an open peripheral edge, with at least one recessed region in the obverse surface of the lid. The dispersal member(s) is/are fixed to and extend from the converse surface of the lid at an open proximal end of the dispersal member. The skirt has a proximal end fixed to and extending outward from the converse surface of the lid at a distance from the dispersal members. Each dispersal member has a sidewall and a distal end together defining an interior of the dispersal member. The sidewall has a plurality of apertures formed therethrough, arranged in a distal section of the sidewall. The distal end is at least partially closed. The lid has at least one lid through-hole formed between the obverse surface and the converse surface, and each dispersal member is fixed to the converse surface of the lid such that a corresponding lid through-hole provides fluid communication from the obverse surface of the lid to the plurality of apertures through the interior of the corresponding dispersal member. The apertures are configured to direct liquid from the interior of the dispersal members generally outward from the dispersal members.

The apertures can perforate an edge of the distal end of at least one of the dispersal members.

The apertures can be arranged in a row around an end of at least one of the dispersal members.

The apertures can be configured within a thickness of the sidewalls of the dispersal members to direct liquid from the interior of the dispersal members generally outward from the dispersal members to at least the distance from the dispersal members. The apertures can be configured as to shape and/or angle within the thickness of the sidewalls of the dispersal members.

The apertures can be angled within a thickness of the sidewalls of the dispersal members so as not to be perpendicular to the sidewalls of the dispersal members.

The apertures can be arranged in a distal half of the dispersal member.

At least one of the dispersal members can extend from the converse surface of the lid a distance that is farther than a distance that the skirt extends from the converse surface of the lid. The apertures can be arranged a distance away from the converse surface of the lid that is farther than a distance that a distal end of the skirt is arranged from the converse surface of the lid, that is, the apertures can extend farther from the lid than the skirt does.

At least one of the dispersal members can extend from the converse surface of the lid a distance that is farther than a distance that at least one other dispersal member extends from the converse surface of the lid, that is, at least one of the dispersal members can be longer than at least one of the others.

The obverse surface and the converse surface of the lid can be substantially planar and parallel to each other.

The proximal end of the dispersal member can be sealed to the converse surface of the lid at the lid through-hole.

A proximal portion of the skirt can extend from the converse surface of the lid at a substantially right angle and a distal portion of the skirt can taper inward.

The skirt can be fixed to the converse surface of the lid at a distance from the peripheral edge of the lid such that a peripheral portion of the lid extends beyond an outside surface of the skirt, forming a ledge of the lid around the skirt. The ledge can be configured to be supported on an outer edge of a brewing chamber, and the skirt can be configured to be arranged within the brewing chamber when the ledge is supported on the outer edge of the brewing chamber. The skirt can be configured to engage a sidewall of the brewing chamber such that the skirt is removably coupled to the brewing chamber such that the lid seals an open end of the brewing chamber.

The skirt can be tiered such that a portion of the skirt closest to the lid has a larger diameter than a portion of the skirt farthest from the lid.

The skirt can be tapered such that a portion of the skirt closest to the lid has a larger diameter than a portion of the skirt farthest from the lid.

A distance that the skirt extends outward from the converse surface of the lid can be at least half a distance that the dispersal member extends from the converse surface of the lid.

According to another aspect of the invention, a beverage brewer and spray apparatus arrangement includes a beverage brewer, and the beverage brewer spray apparatus. The beverage brewer includes a number of injection tubes, a brewing chamber configured to receive fluid from the injection tubes, and an outflow tube configured to receive fluid from the brewing chamber. The skirt is configured to guide the dispersal members into an open proximal end of the brewing chamber such that the dispersal members are arranged within an interior of the brewing chamber. Each lid through-hole is configured to receive a corresponding end of one of the injection tubes such that each dispersal member receives the fluid from the corresponding injection tube and disperses the received fluid through the plurality of apertures. The apertures are configured to direct the fluid generally outward from the dispersal member against a sidewall of the brewing chamber. The outflow tube is configured to receive the dispersed fluid from the brewing chamber.

BRIEF DESCRIPTION OF THE DRAWINGS

These and other aspects, features, and advantages of the invention are disclosed more fully in the following detailed description thereof, presented with reference to the following drawings, wherein:

FIG. 1A is a front view of a beverage brewer according to the present invention.

FIG. 1B is a side view of the beverage brewer according to the present invention.

FIG. 1 C is a top view of the beverage brewer according to the present invention.

FIG. 6A shows a side view of an exemplary dynamic brewing chamber cleaner according to the invention.

FIG. 6B shows a side view of an exemplary dynamic brewing chamber cleaner according to the invention.

FIG. 7 shows a cross-sectional view of an exemplary dynamic brewing chamber cleaner according to the invention.

FIG. 8 shows a cross-sectional view of an exemplary dynamic brewing chamber cleaner according to the invention.

FIG. 9 is a cross-sectional view of an exemplary dynamic brewing chamber cleaner according to the invention taken along line 9-9 of FIG. 8.

FIG. 25 shows an exemplary brewing chamber configuration and an exemplary brewing chamber cleaner according to the invention.

FIG. 26 shows an end view of an exemplary brewing chamber cleaner according to the invention.

FIG. 27 shows a cross-sectional view of an exemplary brewing chamber cleaner according to the invention, taken along line 27-27 of FIG. 26.

FIG. 28A shows a side view of an exemplary extraction nozzle cleaner according to the invention.

FIG. 28B shows an end view of an exemplary extraction nozzle cleaner according to the invention.

FIG. 29 shows an exemplary brewing chamber configuration and an exemplary brewing chamber cleaner according to the invention.

FIG. 30A shows a side view of an exemplary brewing chamber cleaner according to the invention.

FIG. 30B shows a bottom view of an exemplary brewing chamber cleaner according to the invention.

FIG. 31 shows a cross-sectional view of an exemplary brewing chamber cleaner according to the invention, taken alone line 31-31 of FIG. 30B.

Corresponding reference characters indicate corresponding components throughout the several views of the drawings.

DETAILED DESCRIPTION OF THE INVENTION

Figure 2A:
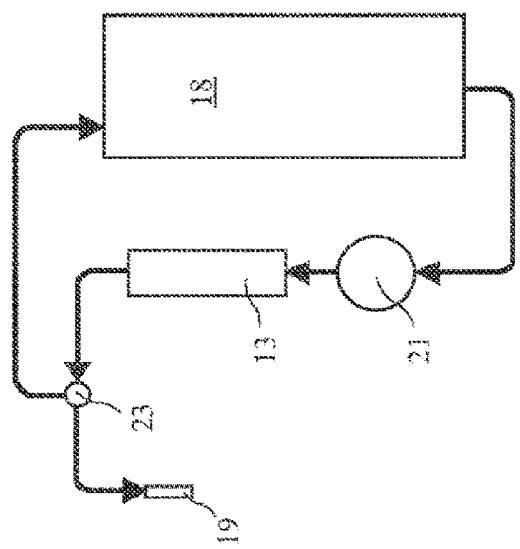
FIG. 2A is a functional diagram of the beverage brewer.

Referring to FIGS. 1A-1C, a typical beverage brewer 10 includes a base 12, a brewing chamber lid 14, a lid handle 16, a water container 18, a display 20, controls 22, and platform 24. Although this exemplary conventional brewer is shown, the invention is contemplated for use with any brewer operating to brew a beverage by passing water through ground brewing material. A cup 26 or other container rests on the platform 24. The beverage brewer 10 provides a flow of water through brewing material to produce a brewed beverage. If hot brewing is desired, the flow of water can be heated by one of any known means, for example, through the use of an electrical heating coil, inductive heating, or a conductive coating on tubing carrying the water.

Figure 2:
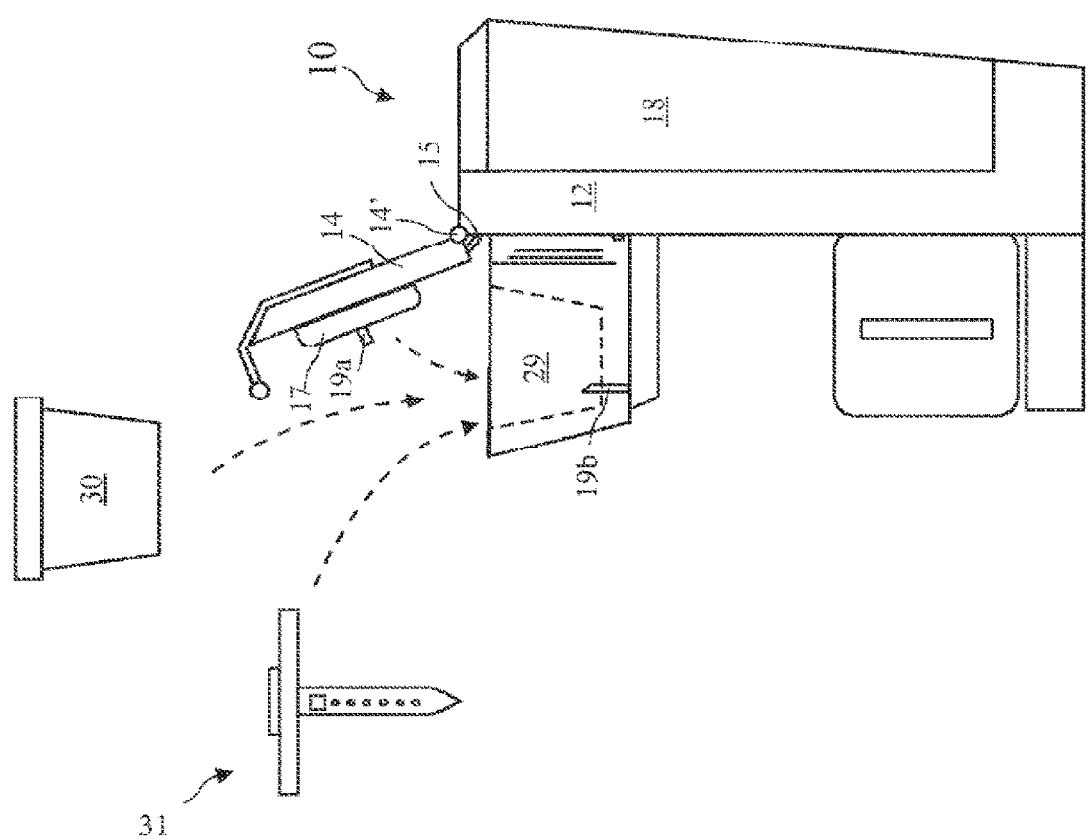
FIG. 2 is a side view of the beverage brewer with an open lid.

With reference to FIG. 2, the beverage brewer 10 brewing chamber lid 14 can be lifted or removed to uncover the brewing chamber 29, allowing placement of a brewing material holder 30, or a brewing chamber cleaner 31 according to the invention, inside the brewing chamber 29. The brewing material holder 30 is used when brewing a beverage in the conventional manner, and the brewing chamber cleaner 31 of the invention is used when cleaning the brewing chamber 29 and/or other elements of the beverage brewer 10. The brewing chamber lid 14 includes a lid hinge 14', and a water tube 15 carries heated water into the lid 14. A pad 17 is arranged on a bottom surface of the brewing chamber lid 14 and presses against the brewing chamber cleaner 31 when the brewing chamber lid 14 is closed, and sprays liquid into the brewing chamber to clean the brewing chamber. An injection nozzle 19a extending down from the brewing chamber lid 14 directs the flow of liquid into brewing material holder 30 when brewing or the brewing chamber cleaner 31 when cleaning, and an extraction nozzle 19b extends up into the brewing chamber 29 to receive and carry the brewed beverage or cleaning liquid from the brewing chamber 29.

A functional diagram of the beverage brewer 10 is shown in FIG. 2A. The exemplary conventional beverage brewer 10 includes a water tank 18, a water pump 21, a heater 13, a check valve 23, and a nozzle 19. The pump 21 provides water under pressure to the nozzle 19. The water heater 13 heats the water, if desired, for brewing or cleaning. The check valve 23 limits the water pressure at the nozzle 19 by returning some of the water flow to the water tank 18 if the pressure at the check valve 23 exceeds a predetermined threshold.

Figure 3A:
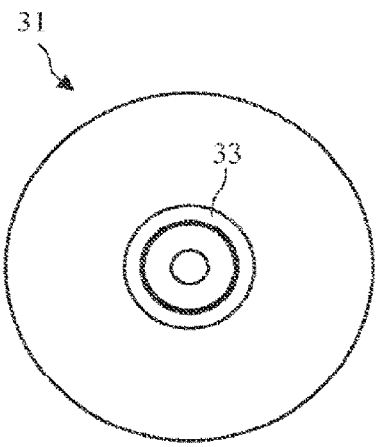
FIG. 3A is a top view of an exemplary dynamic brewing chamber cleaner according to the invention.
Figure 3B:
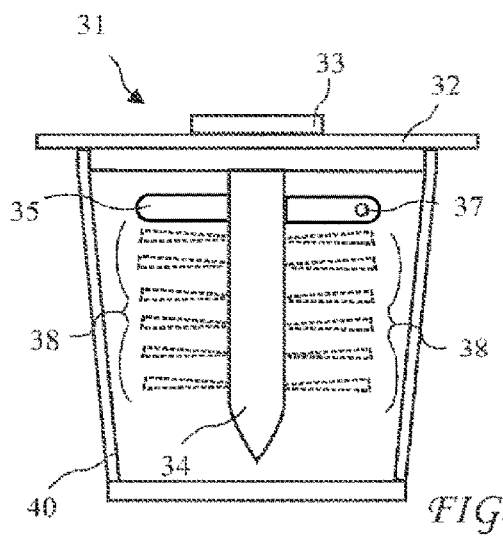
FIG. 3B is a side view of an exemplary dynamic brewing chamber cleaner according to the invention.
Figure 3C:
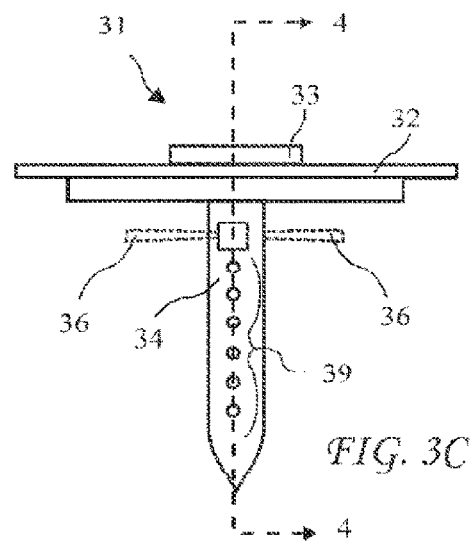
FIG. 3C is a side view of an exemplary dynamic brewing chamber cleaner according to the invention.

Referring to FIGS. 3A-3C, a dynamic brewing chamber cleaner 31, used in place of the brewing material holder when cleaning the beverage brewer 10, includes a lid 32 and a column 34. The lid 32 positions the brewing chamber cleaner with respect to the brewing chamber 29. A seal 33 extends up from the lid 32 to seal to the beverage brewer 10 (see FIG. 2) to provide a flow of water 42 under pressure to the dynamic brewing chamber cleaner 31. The lid 32 can be configured to be held in the beverage brewer so as to close off the open top end of the brewing chamber 29 for cleaning, during which process there is no brewing material holder in the brewing chamber 29.

The brewing chamber cleaner 31 can be configured to be used in beverage brewers that include a top nozzle or puncture needle for injecting pressurized water into a brewing cartridge (pre-loaded and disposable single-use type, or refillable and reusable type), and a bottom nozzle or puncture needle for receiving the brewed beverage and delivering the beverage to a container. In this case, the brewing chamber cleaner 31 is placed on the brewing chamber in place of the brewing cartridge. A pressurized flow of water 42 enters the brewing chamber cleaner 31 through a through-hole 47 in the lid 32 via the top nozzle or puncture needle. Preferably, the lid is arranged on the upper rim of the brewing chamber of the beverage brewer. Alternatively, a frame 40 can optionally be attached to the lid 32, to provide a perimeter configured to be arranged in the brewing chamber of the beverage brewer to provide support for the brewing chamber cleaner 31 while avoiding the bottom nozzle or puncture needle.

Figure 4:
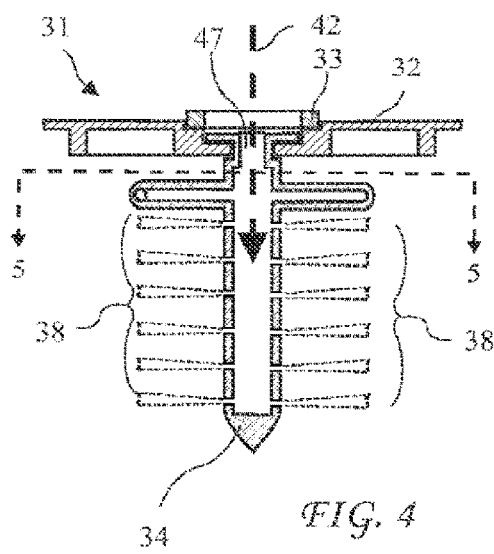
FIG. 4 is a cross-sectional view of an exemplary dynamic brewing chamber cleaner according to the invention taken along line 4-4 of FIG. 3C.
Figure 5:
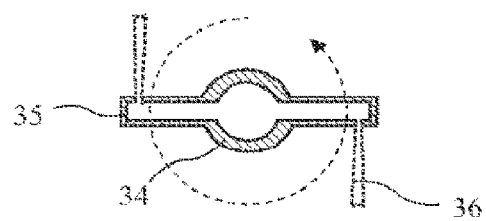
FIG. 5 is a cross-sectional view of an exemplary dynamic brewing chamber cleaner according to the invention taken along line 5-5 of FIG. 4.

Referring to FIGS. 4 and 5, a column (or dispensing member) 34 having an interior 34a is rotatably attached to the lid 32. The hollow column 34 includes ports (or orifices) 39 is configured to receive liquid in the hollow interior 34a and to release radial sprays 38 of the liquid (for example, water or cleaning solution) into the brewing chamber 29. The column 34 includes at least one arm 35 extending radially and including ports 37 releasing sprays of water 36. Force generated by the sprays of water 36 urge the column 34 to spin, and the spinning sprays of water clean the brewing chamber 29.

Referring to FIGS. 6A and B, an alternative embodiment of the dynamic brewing chamber cleaner 31a includes slots 39a configured to provide sheets of water 38a for cleaning the brewing chamber, and ports 37 provide flows of water 36 that cause rotation of the column 34a. This embodiment of the dynamic brewing chamber cleaner 31a is otherwise similar to the dynamic brewing chamber cleaner 31.

Referring to FIG. 7, in an alternative embodiment the water flow 42 through the internal propeller elements 43 causes the column 34a to spin, thus providing dynamic water dispersion into the brewing chamber 29. This embodiment of the dynamic brewing chamber cleaner 31b is otherwise similar to the dynamic brewing chamber cleaner 31.

Referring to FIGS. 8 and 9, in an alternative embodiment the ports 39b direct the flows 36 to rotate the column 34b, which does not include the arms 35. This embodiment of the dynamic brewing chamber cleaner 31c is otherwise similar to the brewing chamber cleaner 31.

Figures 10, 11:
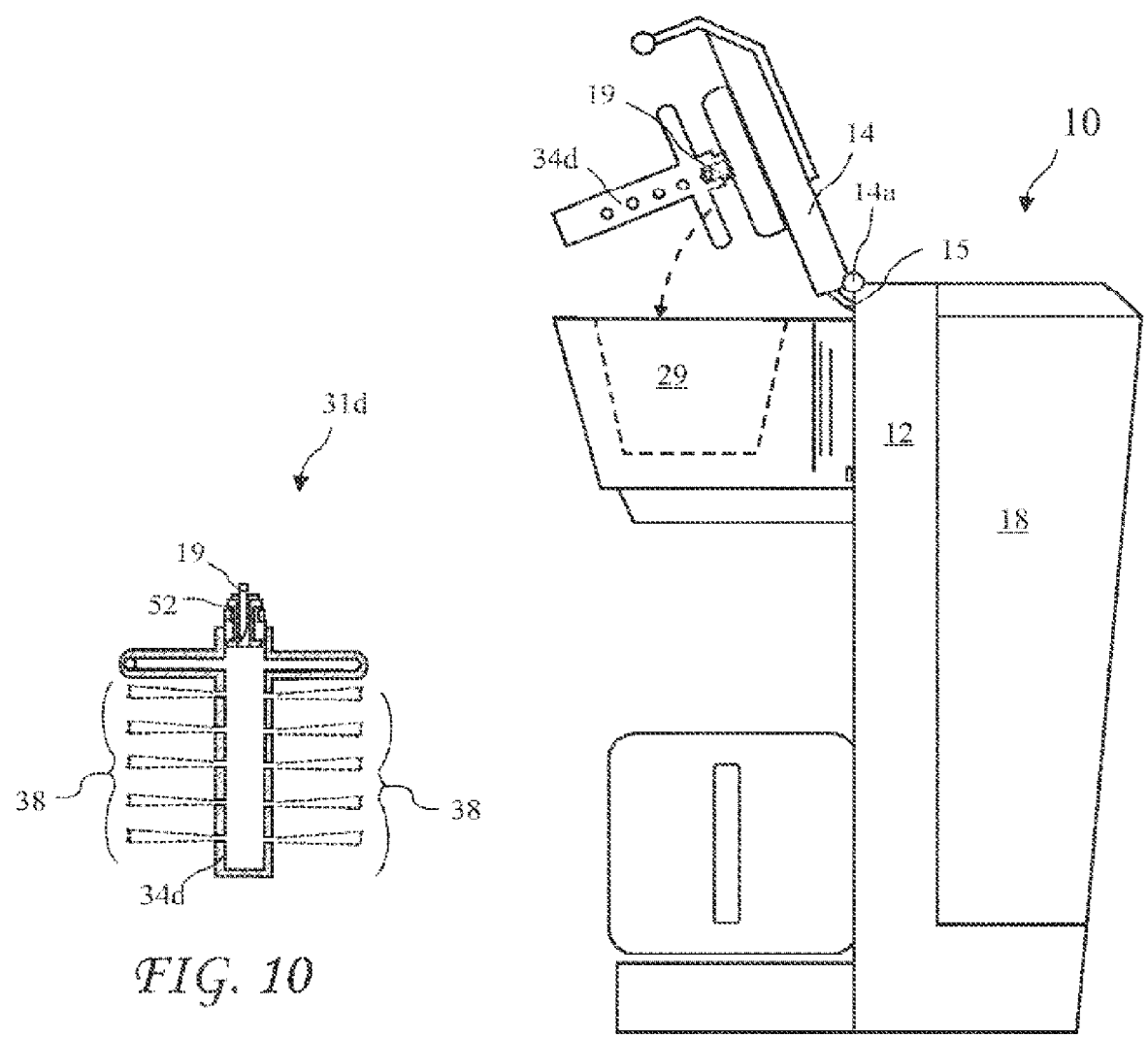
FIG. 10 shows an exemplary dynamic brewing chamber cleaner attachable to a beverage brewer nozzle, according to the invention
FIG. 11 shows a beverage brewer with an exemplary dynamic brewing chamber cleaner according to the invention, attached to the nozzle.

Referring to FIGS. 10 and 11, in an alternative embodiment brewing chamber cleaner 31d is similar to the brewing chamber cleaner 31, but includes a bearing or bushing 52 rotatably connecting the column 34d to the nozzle 19a.

Figure 12:
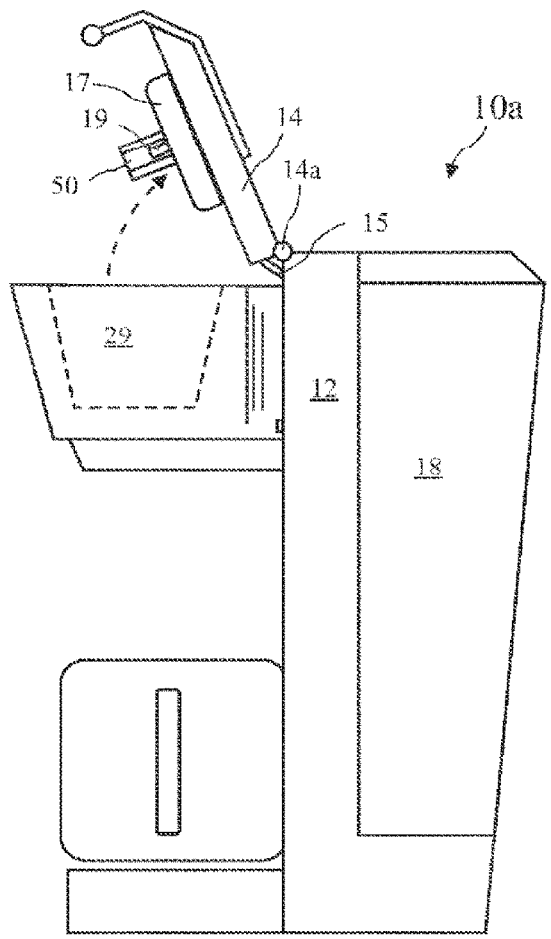
FIG. 12 shows a beverage brewer including a rotating shaft engaging an exemplary brewing chamber cleaner according to the invention.
Figure 13:
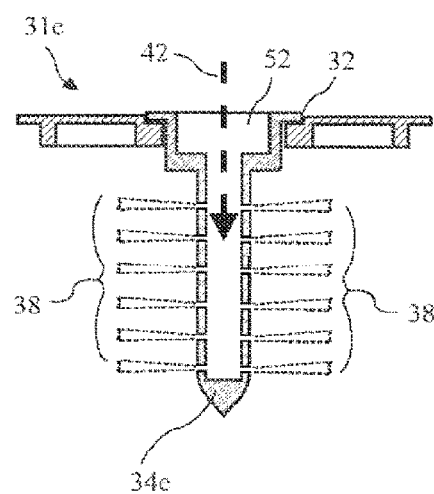
FIG. 13 shows a cross-sectional view of an exemplary dynamic brewing chamber cleaner according to the invention.

Referring to FIGS. 12 and 13, in an alternative embodiment a rotating shaft 50 engages a socket 52 to spin the column 34e.

Figure 14:
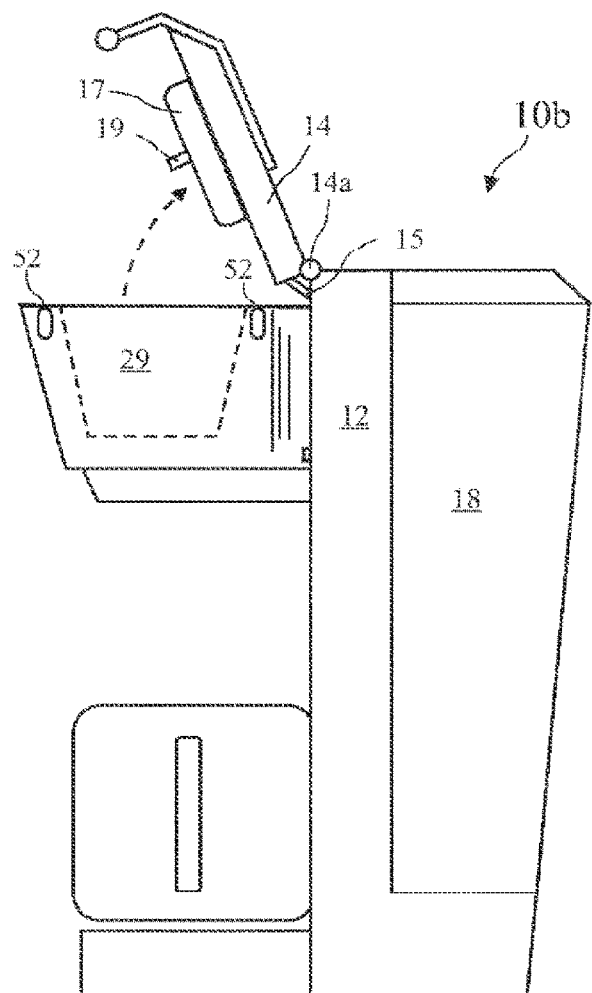
FIG. 14 shows a beverage brewer including stator windings in an exemplary brewing chamber cleaner according to the invention.
Figure 15A:
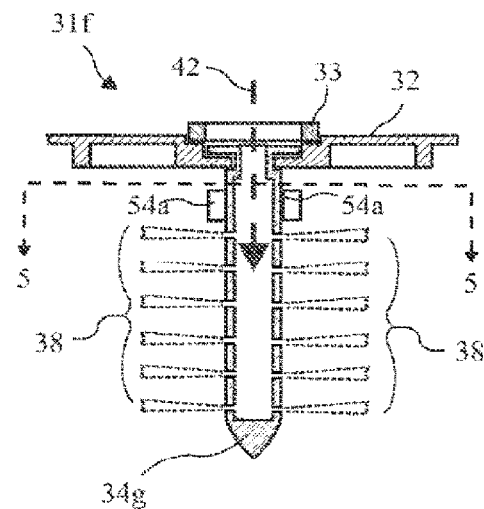
FIG. 15A shows a cross-sectional view of an exemplary dynamic brewing chamber cleaner according to the invention.
Figure 15B:
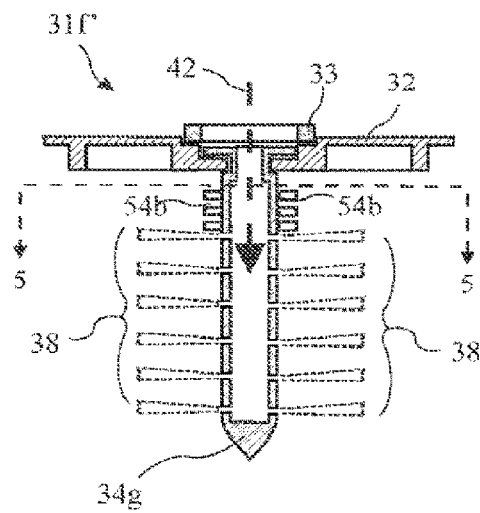
FIG. 15B shows a cross-sectional view of an exemplary dynamic brewing chamber cleaner according to the invention.

Referring to FIGS. 14 and 15A and B, a beverage brewer 10b includes stator windings 52 creating a rotating stator field in an alternative embodiment of the chamber cleaner 31f, including dynamic water dispersion including magnets 54a rotated by the rotating stator field and a squirrel cage 54b rotated by the rotating stator field, respectively.

Figure 16:
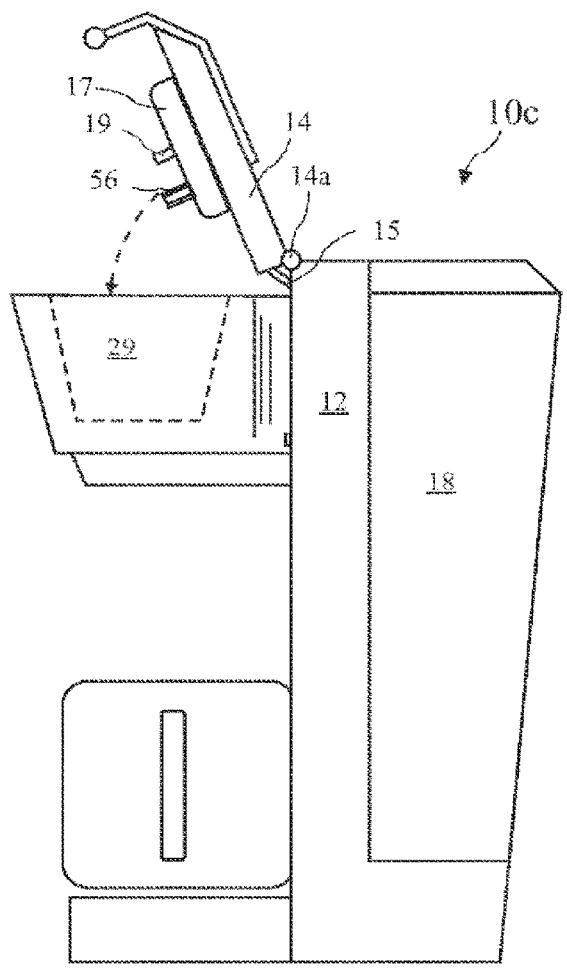
FIG. 16 shows a beverage brewer including an offset rotating shaft engaging an exemplary brewing chamber cleaner according to the invention.
Figure 17:
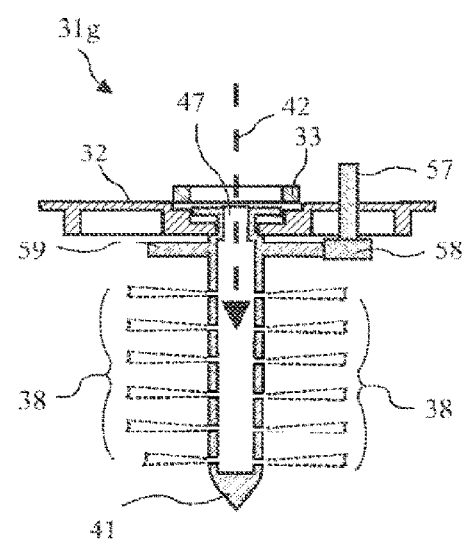
FIG. 17 shows a cross-sectional view of an exemplary dynamic brewing chamber cleaner according to the invention.

Referring to FIGS. 16 and 17, a beverage brewer 10c including an offset rotating shaft 56 engaging an alternative embodiment of the chamber cleaner 31g, including dynamic water dispersion and an offset shaft 57 engaging the offset shaft 56, and gears 58 and 59 rotating the center column. The offset shafts avoid the nozzle 19a and through-hole 47. The gears 58 and 59 can be replaced by rollers, or by a belt and hubs.

Figure 18:
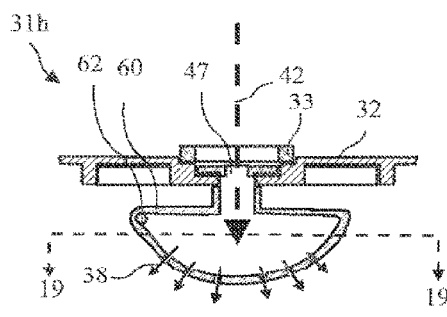
FIG. 18 shows a cross-sectional view of an exemplary dynamic brewing chamber cleaner including dynamic water dispersion according to the invention.
Figure 19:
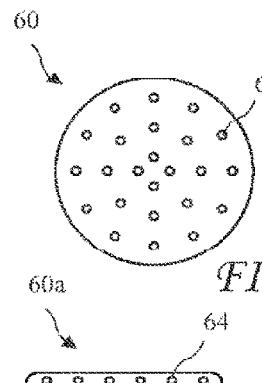
FIG. 19 is a cross-sectional view of an exemplary dome according to the invention, taken along line 19-19 of FIG. 18.
Figure 20:
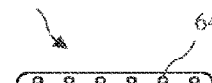
FIG. 20 is a cross-sectional view of an exemplary one-dimensional dome according to the invention, taken along line 19-19 of FIG. 18.

Referring to FIGS. 18 and 19, an alternative embodiment of a dynamic brewing chamber cleaner 31h includes a dome 60 configured to disperse water. The dome 60 can be rotated by offset sprays from ports 62 similar to sprays 36 (see FIG. 5), or the dome 60 can be rotated by any of the structures included in the brewing chamber cleaners 31a-30g. The dome 60 includes at least one dispersion port 64, and preferably multiple such dispersion ports 64. An alternative one-dimensional dome 60a is shown in FIG. 20, having a single row of dispersion ports 64.

Figure 21:
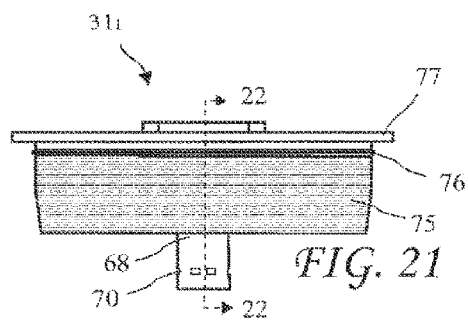
FIG. 21 is a side view of an exemplary fixed brewing chamber cleaner according to the invention.
Figure 22:
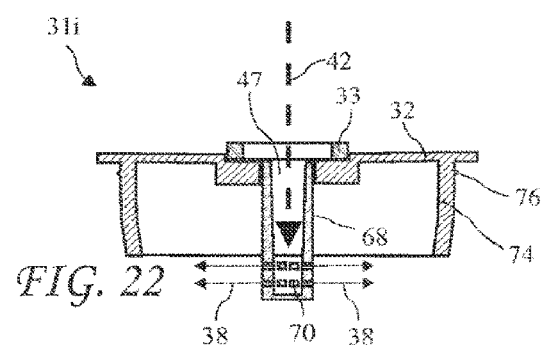
FIG. 22 is a cross-sectional view of an exemplary fixed brewing chamber cleaner according to the invention, taken along line 22-22 of FIG. 21.

With reference to FIGS. 21 and 22, a brewing chamber cleaner 31i includes a lid 32 having outer and inner surfaces. Preferably, the lid is round, and the inner and outer surfaces are parallel, although the lid can assume any shape. A dispersal member 68 is attached to and extends from the inner surface of the lid 32, preferably at a right angle. The dispersal member 68 is tubular, preferably having a round cross-section, with a sidewall that encloses a hollow interior. The sidewall terminates at an opening at the end of the dispersal member 68 attached to the inner surface of the lid 32, and the other end of the dispersal member 68 has a closed, preferably blunt surface at the termination of the sidewall to provide backflow pressure of fluid within the dispersal member 68. The opening at the end of the dispersal member 68 attached to the inner surface of the lid 32 at least partially aligns with the through-hole 47, to provide fluid communication from the outer surface of the lid 32 to the interior of the dispersal member 68, and the dispersal member 68 is preferably sealed against the inner surface of the lid 32 around the through-hole 47. A skirt 74 is also attached to and extends outward from the inner surface of the lid 32.

The sidewall of the dispersal member 68 includes a number of apertures 70 arranged in the distal half of the dispersal member 68, that is, toward the closed end of the dispersal member 68. Preferably, the apertures 70 are arranged only at the distal half of the dispersal member 68. The apertures 70 allow fluid communication from the hollow interior of the dispersal member 68 to outside the dispersal member 68, such that liquid inside the dispersal member 68 can spray 38 outward. Selective placement, orientation, and shape of the apertures 70 can advantageously direct the spray 38 and affect the intensity of the spray 38. For example, the apertures 70 can have a cross-section of between 0.5 mm$^2$ and 12 mm$^2$, between 1.6 mm$^2$ and 10 mm$^2$, or about 6 mm$^2$, varying in size or having a uniform size. FIGS. 21 and 22 show one and two rows of apertures 70, respectively, but the dispersal member 68 can have any number of rows of apertures 70. The apertures 70 need not be arranged in rows at all, and can be distributed on the sidewall in any manner. Preferably, the apertures 70 are not elongated in cross-section, in order to provide a spray that is generally perpendicular to the dispersal member 68 sidewall and directed to the brewing chamber sidewall. For example, the apertures 70 preferably have a cross-section that is round, or square, or otherwise compacted rather than elongated.

The brewing chamber cleaner 31i also includes a skirt 74 that is configured to guide the brewing chamber cleaner 31i into optimal position above the brewing chamber 29 (see FIG. 2) and to resist or limit lateral movement of the cleaner 31i when in use. The skirt 74 can be tapered to simplify placement on the brewing chamber 29. The skirt 74 can be sized for a tight fit against a brewing chamber for cleaning or can be sized smaller for general placement of the cleaner 31i. If the tighter fit is desired, the skirt 74 can include a seal 76, for example in the form of a resilient annular ring, to fill any gap between the skirt 74 and the wall of the brewing chamber.

Thus, the brewing chamber cleaner 31i is a beverage brewer spray apparatus that can be used to spray 38 the walls of a beverage brewer in order to rinse residue from the walls and clean the interior of the brewing chamber. Water, heated or not, can be used with the cleaner 31i, or cleaning fluid can be used to spray 38 the brewing chamber.

For example, a typical beverage brewer for use with the cleaner 31i includes an injection tube, a brewing chamber configured to receive fluid from the injection tube, and an outflow tube configured to receive fluid from the brewing chamber. During a brewing process, the injection tube receives water, typically heated, and provides the water to the brewing chamber. The brewing chamber typically contains a carrier for ground brewing material, such as a filter pod (including tea bags), a plastic single-use beverage cartridge (such as a Keurig® K-Cup®), or a reusable beverage material holder (such as any of the Perfect Pod® reusable filter cups). Water from the injection tube passes through the ground beverage material in the carrier to brew the beverage, which then flows out of the brewing chamber through the outflow tube. If the carrier has a closed, water-impermeable surface, the injection tube can be an injection needle with a sharp edge. Likewise, the outflow tube can be an outflow needle having a sharp edge.

The skirt 74 is configured to guide the dispersal member 68 into an open end of the brewing chamber so that the dispersal member 68 is arranged within the interior of the brewing chamber. That is, an outer surface of the skirt and a surface of the interior of the brewing chamber are configured for mutual sliding engagement so that the skirt 74 is removably coupled to the brewing chamber such that the dispersal member 68 is disposed in the interior of the brewing chamber. The skirt 74 can be sized to provide a close fit against the inner sidewall of the brewing chamber, or can be sized for a less close fit so that it facilitates proper placement of the cleaner 31*i*, which can be supported above the brewing chamber by the lid 32. For example, a rim 77 of the lid 32 can extend radially beyond the outer edge of the skirt 74 to support the brewing chamber cleaner 31*i* above the brewing chamber 29 whether the fit is close or not. The skirt 74 can include scoring 75 to provide a friction fit to the walls of the brewing chamber. That is, the surface of the skirt 74 can have scratches or be otherwise textured to increase the friction of the surface of the skirt 74. Alternatively, the outer surface of the skirt 74 can include a raised portion, such as an annular raised portion, and the surface of the interior of the brewing chamber can include a corresponding recessed portion to provide mutual sliding positive engagement. As another alternative to scoring 75 on the skirt 74 surface, the skirt 74 can include a seal 76, such as a resilient ring captured in a groove or other sealing arrangement. The lid through-hole 47 is preferably arranged in the center of the lid and is configured to receive an end of the injection tube, whether sharpened or not, so that the dispersal member 68 receives fluid (water or cleaning fluid) from the injection tube and disperses the received fluid through the plurality of apertures 70 in the dispersal member 68, aided by the backflow pressure created at the closed end of the dispersal member 68. The apertures 70 are sized and oriented to disperse the fluid radially away from the dispersal member 68 and against the sidewall of the brewing chamber so as to clean the brewing chamber sidewall. Some of the apertures 70 can be configured to direct the flow of fluid downward to wash the floor of the brewing chamber, but at least some of the apertures 70 are configured to direct the flow specifically at the brewing chamber sidewall.

The apertures 70 are configured to provide this direction of flow, for example, by the size, shape, and angle of the aperture 70 within the sidewall of the dispersal member 68. That is, the sidewall of the dispersal member 68 has a thickness, and therefore each aperture 70 has a three-dimensional shape within the dispersal member 68 sidewall. The apertures 70 can all be sized and shaped uniformly, or differently in sets, or independently, with the resulting spray 38 coordinating to produce the desired coverage on the sidewalls of the brewing chamber, as well as on the floor of the brewing chamber if desired. Any or all of the apertures 70 can be cylindrical, with parallel walls and a uniform diameter. Alternatively, any or all of the apertures 70 can vary in cross-section along the length of the aperture, either uniformly in a conical cross-section, or modulating, or undulating (periodically or otherwise). Regardless of shape, any or all of the apertures 70 can be angled in any direction. The combination of the length, shape, and direction of the aperture, as well as the pressure of the fluid in the interior of the dispersal member 68, will dictate the pattern and force of the fluid spray 38 out of the dispersal member 68. The outflow tube is configured to receive the dispersed fluid from the brewing chamber after it has sprayed the brewing chamber and washed down the sidewalls of the brewing chamber.

Figure 23A:
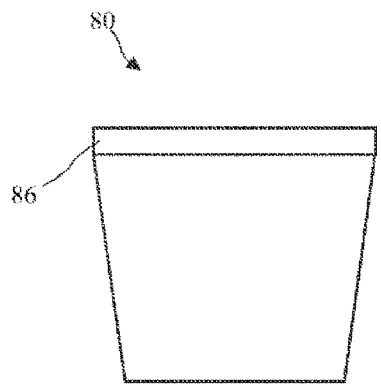
FIG. 23A is a side view of an exemplary extraction nozzle cleaning accessory according to the invention.
Figure 23B:
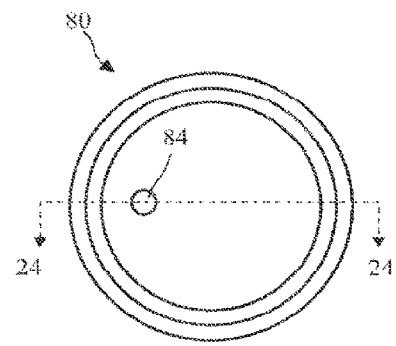
FIG. 23B is a top view of an exemplary extraction nozzle cleaning accessory according to the invention.
Figure 24:
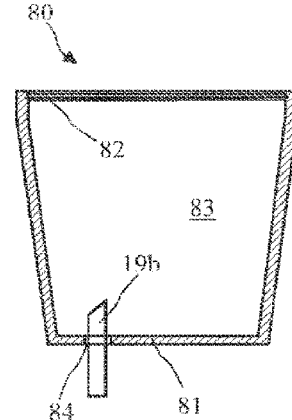
FIG. 24 is a cross-sectional view of an exemplary extraction nozzle cleaning accessory according to the invention, taken along line 24-24 of FIG. 23B.

The cleaner 31*i* can also be used specifically to clean the outflow tube. With reference to FIGS. 23A, 23B, and 24, an extraction nozzle cleaner 80 can include a container made of fluid-impermeable material. As shown, the container can include a distal wall, shown here at the bottom, and a sidewall fixed at a distal or bottom edge to a periphery of the distal wall and extending from the distal wall. Inner surfaces of the distal wall and sidewall define an interior of the container, and an open proximal end is defined by a proximal edge of the sidewall outermost from the distal wall. As shown, the distal wall of the container includes an unobstructed container through-hole 84, That is, this through-hole accommodates the outflow tube so that the outflow tube can extend into the interior of the container without bending or otherwise having to accommodate an internal path of the through-hole. The cleaner 31*i* cleans the outflow tube by providing fluid, such as water or cleaning fluid (either of which can be heated) to the interior of the container. The fluid then passes through the outflow tube in order to clean the outflow tube. To be sure that the fluid is directed to the outflow tube, the inner surface of the container sidewall preferably has no openings, so that the container through-hole 84 and the open proximal end of the container are the only openings in the surface of the interior of the container. To accommodate the layout of the particular beverage brewing coupled with the cleaner 31*i*, the container through-hole 84 is located in the distal wall in the proper location, whether central in the distal wall or offset from a center of the distal surface of the container.

In this arrangement, the skirt 74 and the container are configured to mutually engage such that the open proximal end of the container is removably coupled to the skirt 74, preferably such that the lid seals the open proximal end of the container. That is, an outer surface of the skirt 74 and a surface of the interior of the container are configured for mutual sliding engagement so that the container is removably couplable to the skirt 74 such that the dispersal member 68 is disposed in the interior of the container. In this case, the skirt 74 is configured to guide the dispersal member 68 into the open end of the container so that the dispersal member 68 is arranged within the interior of the container. The skirt 74 preferably is sized to provide a close fit against the inner sidewall of the container, but can be sized for a less close fit so that it facilitates proper placement of the cleaner 31*i*, which can be supported above the container by the lid 32. For example, a rim 77 of the lid 32 can extend radially beyond the outer edge of the skirt 74 to support the brewing chamber cleaner 31*i* above the container whether the fit is close or not. The skirt 74 can include scoring 75 to provide a friction fit to the walls of the container when the cleaner 31*i* is configured for a close fit that seals to the container. Alternatively, the outer surface of the skirt 74 can include a raised portion, such as an annular raised portion, and the surface of the interior of the container can include a corresponding recessed portion to provide mutual sliding positive engagement.

Preferably, the skirt 74 at least partially encompasses the dispersal member 68. For example, the skirt 74 can form a closed ring or border surrounding the dispersal member 68 to provide contact around the entire periphery of the brewing chamber. Alternatively, the skirt 74 can be made of skirt 74 sections arranged at different locations around the lid, to contact corresponding sections of the periphery of the brewing chamber, with gaps between the sections. For example, the skirt 74 can include two skirt 74 sections arranged opposite each other on the lid, with each section being large enough to secure the lid to the brewing chamber and around the dispersal member 68. It should be apparent that three, four, or any number of skirt 74 sections can make up the skirt 74, as long as they are arranged to secure the lid to the brewing chamber and surround the dispersal member 68. To provide a secure coupling with the brewing chamber or container, the length of the skirt 74 with respect to the length of the dispersal member 68 should also be considered. For example, in some applications it would be advantageous for a distance that the skirt 74 extends outward from the converse surface of the lid to be at least half a distance that the dispersal member 68 extends from the converse surface of the lid, in order to provide secure coupling between the skirt 74 and the brewing chamber or container.

The skirt 74, whether composed of a single piece or multiple sections, should have a length that provides secure contact with the sidewall of the brewing chamber. However, the skirt 74 should not extend lower than the lower end of the dispersal member 68, and preferably no lower than the portion of the dispersal member 68 that includes the apertures 70. That is, the dispersal member 68 should extend from the converse surface of the lid a distance that is farther than a distance that the skirt 74 extends from the converse surface of the lid, so that the skirt 74 doesn't block the spray 38 from the apertures 70. Further, the skirt 74 preferably extends from the converse surface of the lid at a substantially right angle, to correspond to the angle of the brewing chamber sidewall. Of course, if the brewing chamber sidewall is angled differently, the angle of the skirt 74 should correspond to that angle. Because the skirt 74 preferably has a tight fit against the sidewall of the brewing chamber, the leading end of the skirt 74 can taper inward, to facilitate locating the skirt 74 inside the brewing chamber sidewall before pressing down on or screwing in the lid to secure the apparatus. Because the apparatus can be used with various different brewing machines and therefore with brewing chambers having various different sizes, the skirt 74 can be fixed to the converse surface of the lid at a distance from the peripheral edge of the lid such that a peripheral portion of the lid extends beyond an outside surface of the skirt 74, forming a ledge around the skirt 74. Therefore, for larger brewing chambers in which the skirt 74 is not a tight fit, the apparatus can still rest above the brewing chamber, supported by the ledge. Also, if the skirt 74 is sized to couple with a container as described above, the apparatus can still be used to clean the brewing chamber when used without the container, again by supporting the apparatus above the brewing chamber on the ledge.

In order for the cleaner 31*i* to reliably couple with the container, the container sidewall preferably has a substantially uniform height, although this is not necessary, as long as the rim 77 of the container provides a firm surface on which the rim 77 of the lid 32 can rest, or the inner sidewall of the container provides a firm enough surface to maintain contact with the skirt 74. Likewise, in order to provide stable support for the container on the floor of the brewing chamber, an outer surface of the distal wall preferably is flat and defines the outer boundary of the container, that is, the container sidewall preferably does not extend beyond the distal wall of the container. Alternatively, the outer surface of the distal wall can be shaped to match the shape of the surface of the brewing chamber floor, for example rounded if the brewing chamber floor is rounded.

In order for the outflow tube to maintain a tight fit in the container through-hole 84, a grommet, gasket, or other resilient element can be fitted in or around the container through-hole 84, so as to seal the fit between the outflow tube and the container through-hole 84. Alternatively, all or part of the distal wall can be made of rubber, silicone, or other resilient material. The container through-hole 84 can be punched or otherwise removed from this resilient material, or a simple slit or cross-slits can be cut into the resilient material, through which the outflow tube can be pushed to enter the interior of the container. Regardless of the particular arrangement, it is preferable that the container through-hole 84 or slit conform to the outer dimension of the outflow tube to reduce leakage. As mentioned above, the container through-hole 84 is located in the distal wall in a location corresponding to the location of the outflow tube. If the distal wall includes a slit rather than a through-hole, several slits can be made in the distal wall so the container can be used with different models of beverage brewers having outflow tubes in different positions, providing flexibility in use of the container. Because the distal wall is made of a resilient material, the slits close off any potential opening until the outflow tube is pushed through. As another alternative, the distal wall can include no through-hole or slits, and instead can be a completely closed surface. This configuration of the distal wall can be used when the outflow tube is a sharpened outflow needle, which can puncture the distal wall in the proper location when the container is placed in position for use.

Referring to FIGS. 23A and B and 24, the container of the extraction nozzle cleaner 80 can be a frusto-conical-shaped cup that is deep enough to capture a portion of the extraction nozzle 19*b* in an interior 83. The container can be sized so as to be used in brewing chambers of various sizes, or can be sized for use in the brewing chamber of a particular beverage brewer. A purpose of the container is to contain the spray 38 of liquid from the brewing chamber cleaner 31*i* and to direct the liquid to the extraction nozzle, and therefore the size and shape is immaterial to the function of the container. Therefore, the container can be for example, cylindrical, or can have a rectangular cross-section, and any size or shape of container that will fit in a brewing chamber is contemplated for use as the container of the extraction nozzle cleaner 80 of the invention. The container can be shaped as a frustoconical cup, or can take any other shape so long as it can receive fluid from the dispersal member 68 and pass it to the outflow tube. It is also possible that the container can be used without the lid, in this case receiving fluid directly from the injection tube. Alternatively, the container can be shaped to direct the fluid to the outflow tube, such as by providing a cone-shaped container in which the tip fits over the outflow tube. As another alternative, the container can be a flexible or rigid tube directly connecting the injection tube to the outflow tube.

The extraction nozzle cleaner 80 includes a top portion 86 configured to engage the skirt 74 of the brewing chamber cleaner 31*i* (see FIG. 21). The top portion 86 can include an annular recess 82 for positive engagement with the annular ring 76 of the brewing chamber cleaner 31*i*, and/or can a surface configured to cooperate with the scoring 75 on the skirt 74 to securely friction-fit the extraction nozzle cleaner 80 to the brewing chamber cleaner 31*i*. This scoring 75 can be cuts, scratches, or other texturing that increases the friction of the surface of the top portion 86, the mating surface of the skirt 74, or both, such that the skirt 74 can be press-fit into the container securely for use in cleaning the extraction nozzle but allowing for easy extraction of the skirt 74 from the container. Of course, any mechanism for mating the skirt 74 to the container, such as a snap-fit arrangement, a threaded screw-on arrangement, or the like is contemplated for use with the skirt 74 and container of the invention.

Thus, the extraction nozzle cleaner 80 can be a sturdy plastic cup or other container including a pre-formed container through-hole 84 aligned with the extraction nozzle 19*b* (see FIG. 2), and the base 81 of the extraction nozzle cleaner 80 can be a rubber material or other flexible material configured to slide over the extraction nozzle 19*b*, providing a seal. The extraction nozzle cleaner 80 base 81 can also be a thin plastic piece with no pre-formed container through-hole 84, and an extraction nozzle 19*b* that is a sharpened needle can pierce the plastic when the extraction nozzle cleaner 80 is inserted into the brewing chamber 19, for example, when the brewing chamber lid 14 is closed on the brewing chamber cleaner 31*i*.

When the beverage brewer 10 is operated with cleaning liquid in the water tank 18 (see FIG. 2) and the brewing chamber cleaner 31*i* in the brewing chamber 19 without the extraction nozzle cleaner 80 attached, the cleaning liquid is sprayed out of the dispersal member 68 against the interior of the brewing chamber 19, thus cleaning the brewing chamber 29. When the beverage brewer 10 is operated with cleaning liquid in the water tank 18 (see FIG. 2) and the brewing chamber cleaner 31*i* in the brewing chamber 29 with the extraction nozzle cleaner 80 attached, the cleaning liquid is sprayed out of the dispersal member 68 and into the extraction nozzle cleaner 80, washing the extraction nozzle 19*b* as the cleaning liquid flows out of the extraction nozzle cleaner 80 through the extraction nozzle 19*b*. Thus, in any single cleaning cycle, the brewing chamber 29 or the extraction nozzle 19*b* can be cleaned, and both can be cleaned if multiple cleaning cycles are performed. The cleaning cycles can be performed in either order, and can be performed any number of times. The cleaning liquid can be just water, either heated or unheated, or can be a cleaning fluid, diluted or undiluted, such as soapy water or a cleaning solvent. If a cleaning fluid is used, a final step is preferably performed using water only to rinse the brewing chamber 29 and extraction nozzle 19*b*.

As described, the skirt 74 can be sized to facilitate placement of the cleaner 31*i* within the brewing chamber, or can be sized to provide a close, secure fit with the upper inner sidewall of the brewing chamber. Likewise, the skirt 74 can be sized to facilitate placement of the cleaner 31*i* within the extraction nozzle cleaner 80, or can be sized to provide a close, secure fit with the upper inner sidewall of the extraction nozzle cleaner 80. In order to provide a close fit of the cleaner 31*i* with both the brewing chamber and the extraction nozzle cleaner 80, two concentric skirts can be provided. The outer skirt 74 can be sized to facilitate placement of the cleaner 31*i* within the brewing chamber or to provide a close, secure fit with the upper inner sidewall of the brewing chamber, and the inner skirt 74 can be sized to facilitate placement of the cleaner 31*i* within the extraction nozzle cleaner 80 or to provide a close, secure fit with the upper inner sidewall of the extraction nozzle cleaner 80. Thus, if desired, the same cleaner 31*i* can be used for cleaning cycles directed to the brewing chamber or the extraction nozzle cleaner 80, and that cleaner 31*i* can be used to provide a close, secure fit with each. Instead of including two skirts, the cleaner 31*i* can include a single skirt 74 having a thickness such that an outer diameter of the skirt 74 is sized to provide a close, secure fit with the upper inner sidewall of the brewing chamber, and an inner diameter of the skirt 74 is sized to provide a close, secure fit with the upper outer sidewall of the brewing chamber extraction nozzle cleaner 80. That is, the outer diameter of the skirt 74 can be sized for engagement with the inner sidewall of the brewing chamber, and the inner diameter of the skirt 74 can be sized for engagement with the outer sidewall of the extraction nozzle cleaner 80, thus providing a single skirt 74 that can be used in either cleaning cycle.

Another embodiment of a brewing chamber cleaner 31*j* is shown in FIG. 25, along with a brewing chamber 29*a*, and a brewing material cartridge 30*a* for the brewing chamber 29*a*. As shown, this embodiment of the brewing chamber cleaner 31*j* is particularly useful when cleaning a brewing chamber 29*a* in which the brewing material cartridge 30*a* is arranged on its side in the brewing chamber 29*a* for beverage brewing, and the injection nozzle 19*a* and extraction nozzle 29*b* are both arranged in a brewing chamber lid 14*a*. The brewing chamber cleaner 31*j* includes a first through-hole 47 for the injection nozzle 19*a*, and a second through-hole 47*a* for the extraction nozzle 19*b*.

Referring to FIGS. 26 and 27, a lid 32*a* of the brewing chamber cleaner 31*j* includes an extended portion 32*b* including the through-hole 47*a* for the extraction nozzle 19*b*, and a skirt 74*a* providing clearance for the extraction nozzle 19*b*. The brewing chamber cleaner 31*j* is otherwise similar to the brewing chamber cleaner 31*i* described above.

Referring to FIGS. 28A and 28B, the interior of the extraction nozzle cleaner 80*a* includes an extraction nozzle clearance area 83*a* providing space for the extraction nozzle 19*b*. The extraction nozzle cleaner 80*a* is otherwise similar to the extraction nozzle cleaner 80 described above.

Referring to FIG. 29, a brewing chamber 29*b* is configured to receive a brewing cartridge 30*h*, for example, of the type disclosed in U.S. Pat. No. 8,087,347, the entire disclosure of which is incorporated herein. Referring to FIGS. 30A and B and 31, a brewing chamber cleaner 31*k* includes a lid portion 32, an inlet column 88, and a support member 89 to position the brewing chamber cleaner 31*k* in the brewing chamber 29*b*. A cylindrical extension 68 is generally centered in the brewing chamber 29*b* and includes orifices 70. The inlet column 88 includes a tapered inlet 47. The brewing chamber cleaner 31*k* is otherwise similar to the brewing chamber cleaner 31*i* described above.

Figure 32:
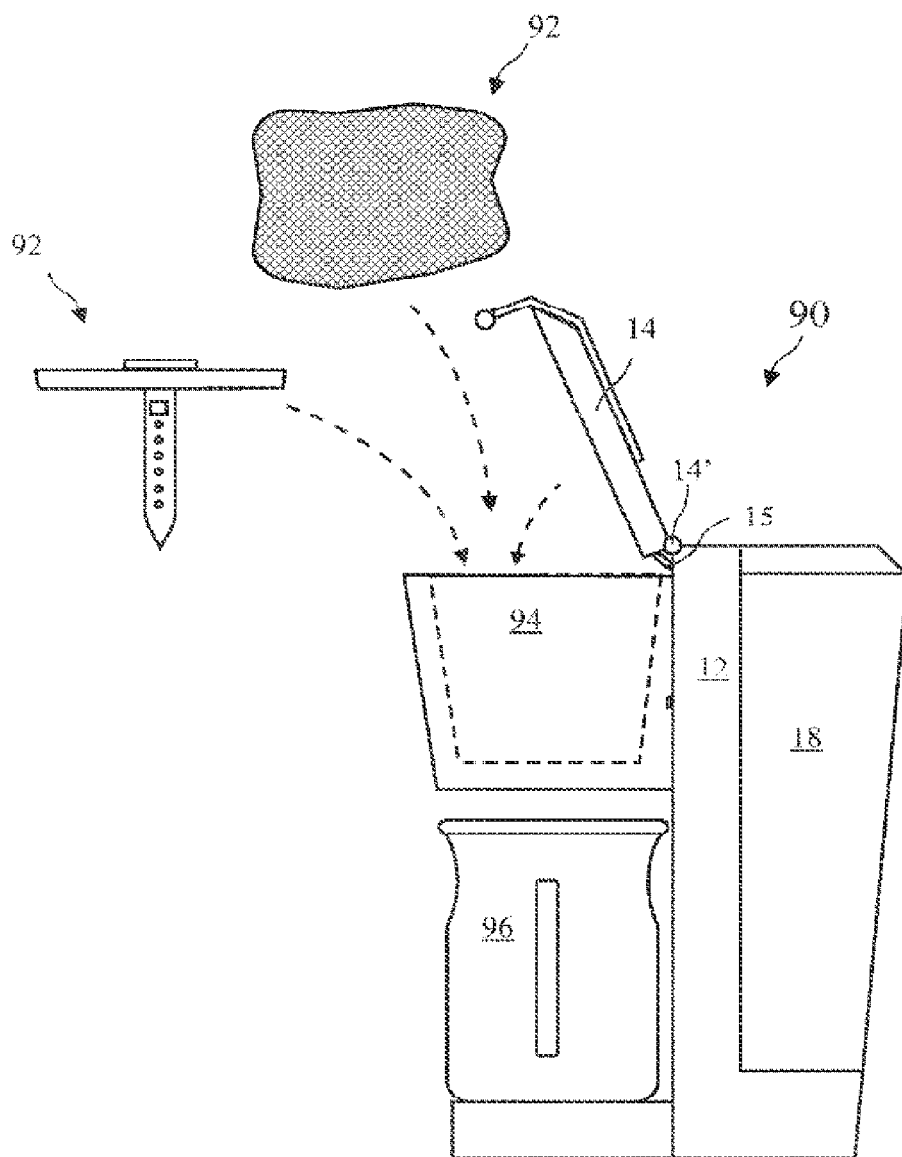
FIG. 32 shows a multi-cup beverage brewer and an exemplary brewing chamber cleaner according to the invention.
Figure 33:
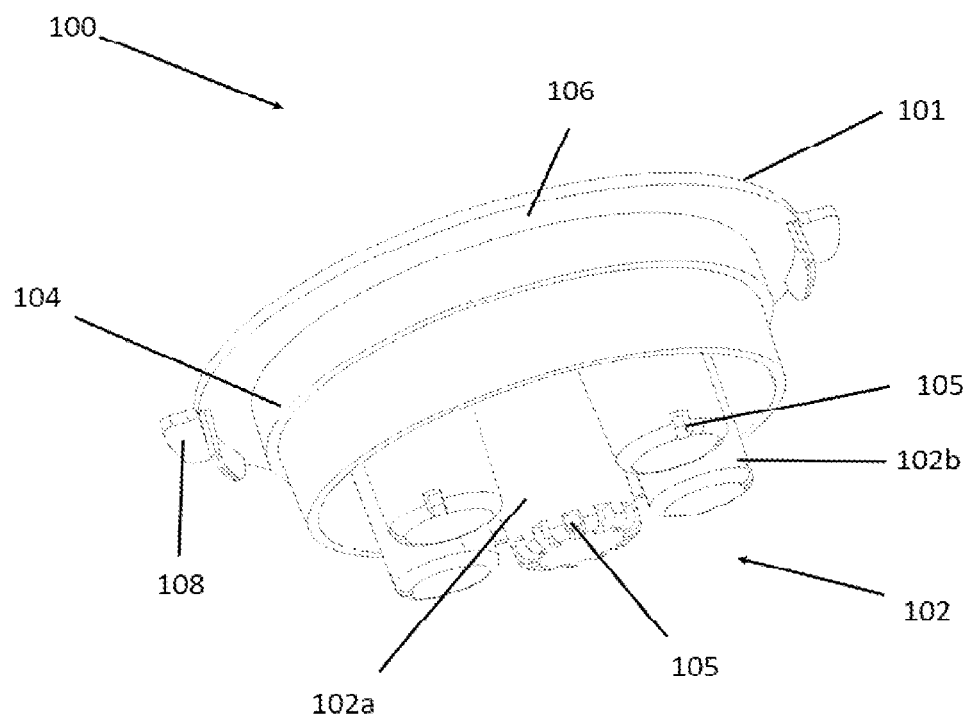
FIG. 33 shows an underside view of an exemplary beverage brewer spray apparatus according to the invention.
Figure 34:
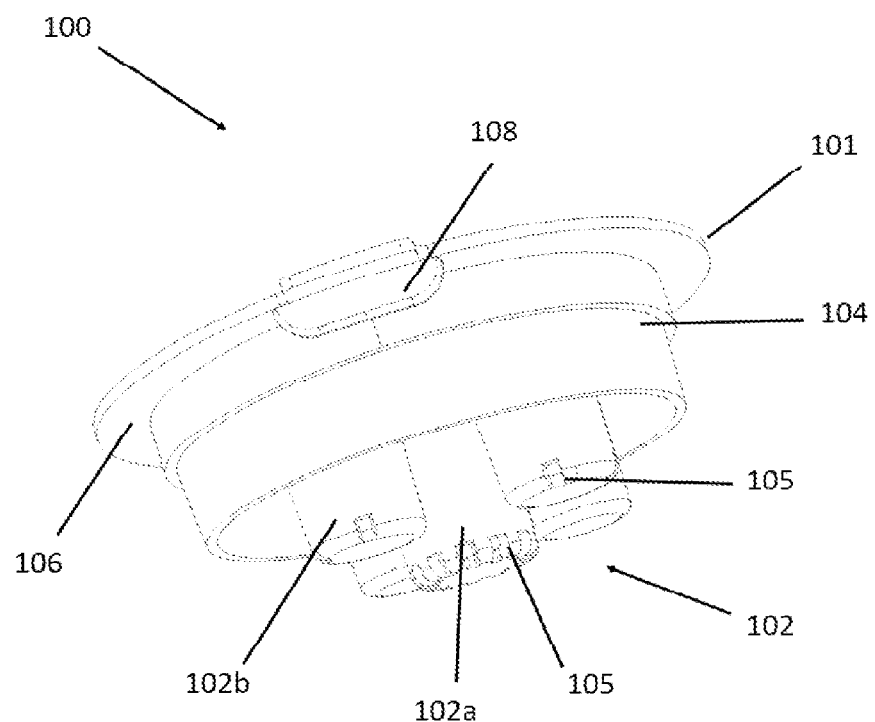
FIG. 34 shows an underside view of an exemplary beverage brewer spray apparatus according to the invention.
Figure 35:
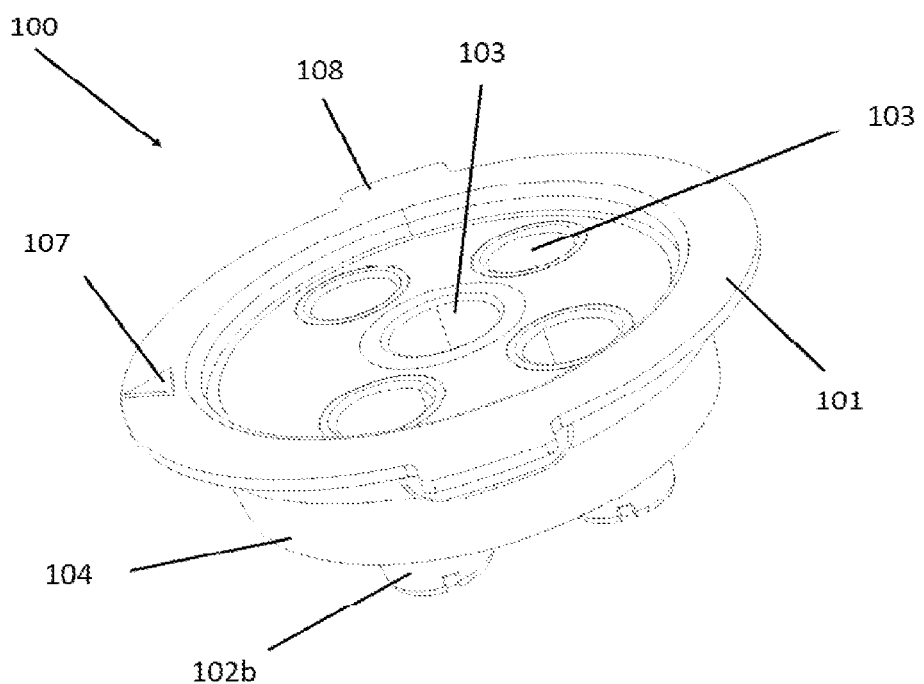
FIG. 35 shows a top-side view of an exemplary beverage brewer spray apparatus according to the invention.
Figure 36:
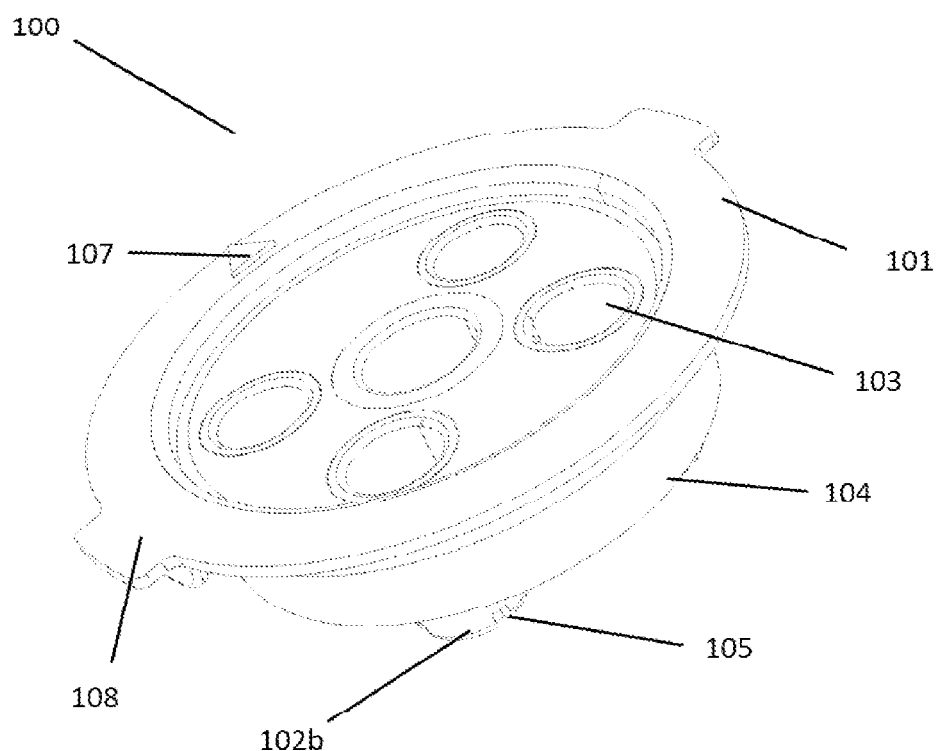
FIG. 36 shows a top-side view of an exemplary beverage brewer spray apparatus according to the invention.
Figure 37:
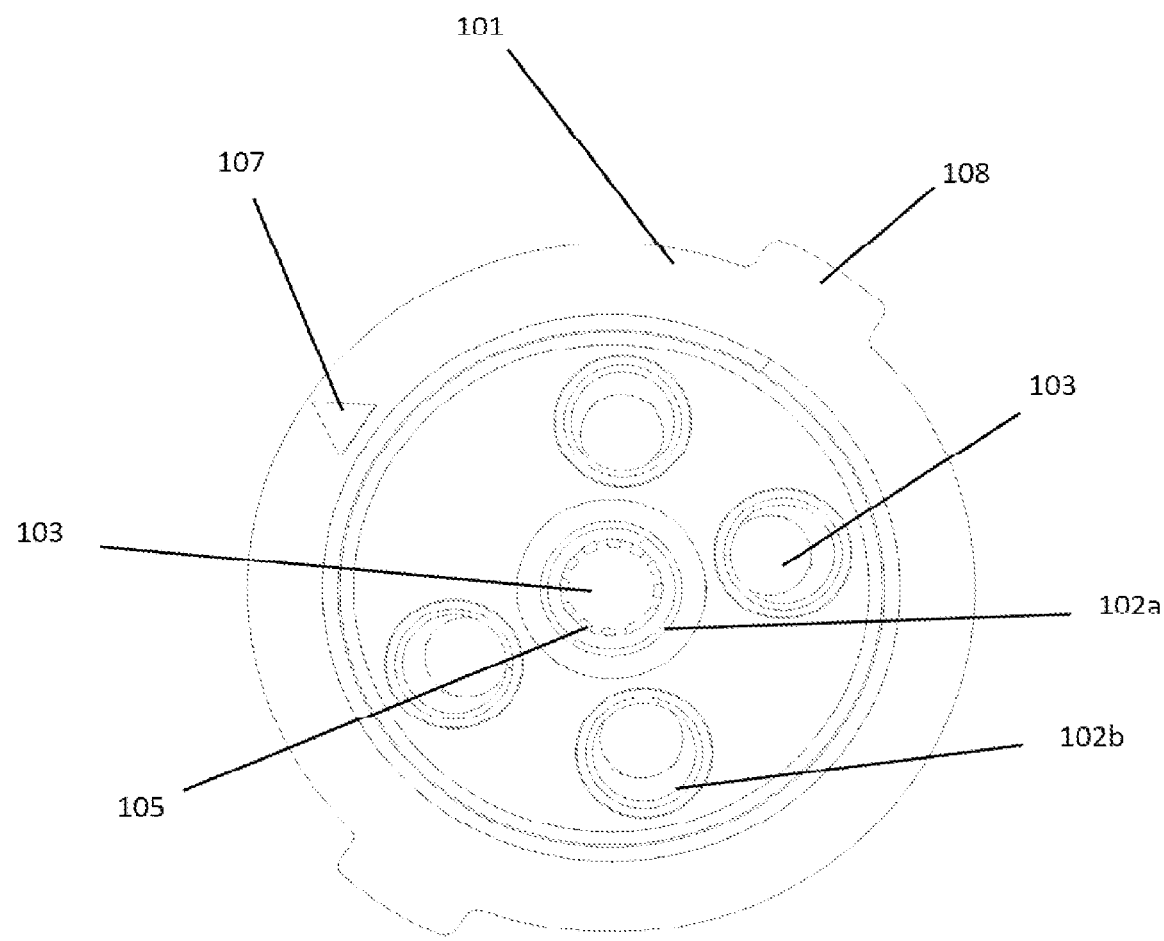
FIG. 37 shows a top view of an exemplary beverage brewer spray apparatus according to the invention.
Figure 38:
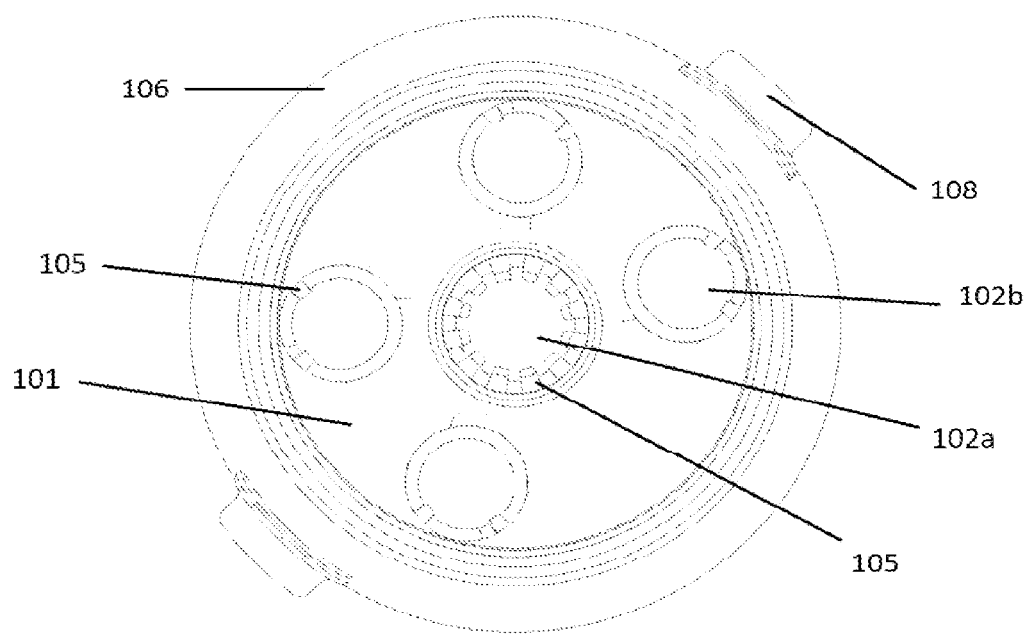
FIG. 38 shows a bottom view of an exemplary beverage brewer spray apparatus according to the invention.
Figure 39:
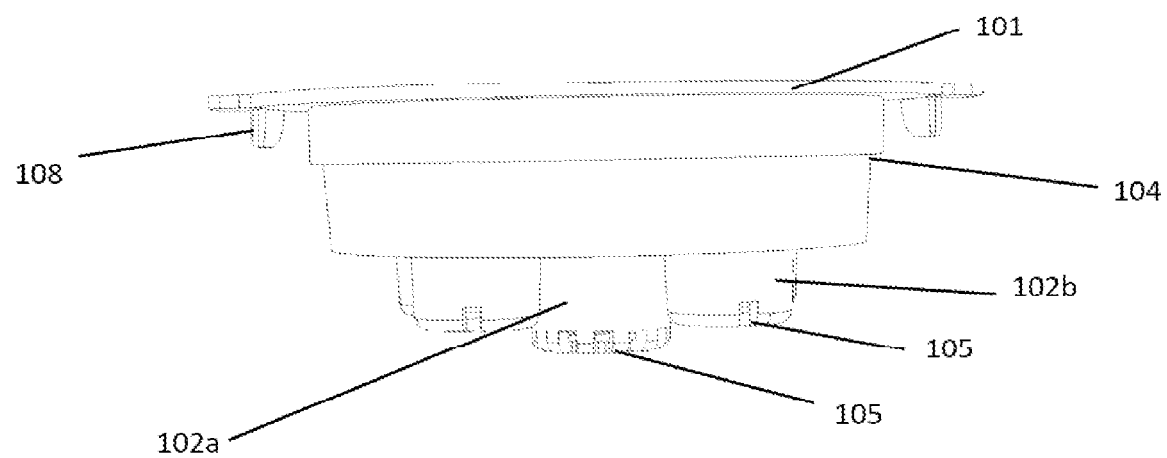
FIG. 39 shows a side view of an exemplary beverage brewer spray apparatus according to the invention.
Figure 40:
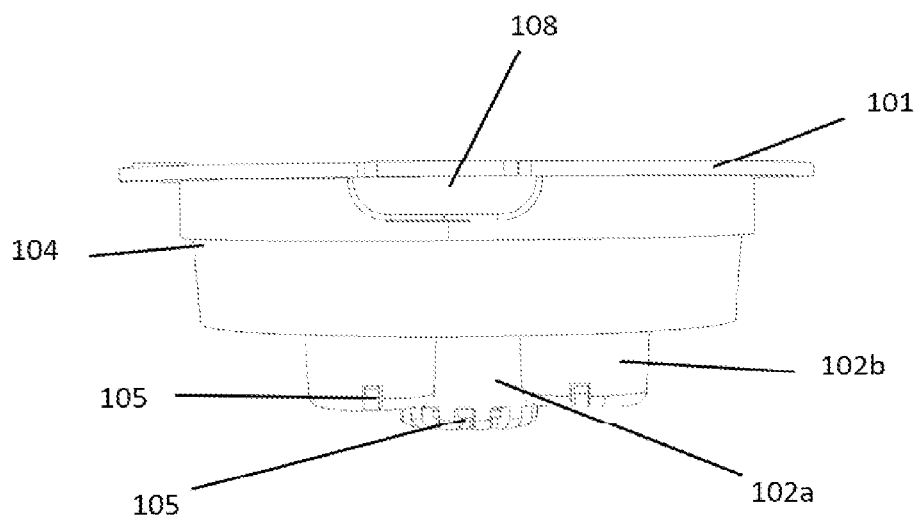
FIG. 40 shows a side view of an exemplary beverage brewer spray apparatus according to the invention.

Referring FIG. 32, a multi-cup beverage brewer 90 includes a brewing chamber 94 for receiving a portion of brewing material 92 to make a multi-cup amount of brewed beverage released into a carafe 96. The brewing chamber cleaner 92 preferably rests on a top edge of the brewing chamber 94, but can rest on features of the interior of the brewing chamber 94. Other than size, and positioning features, the brewing chamber cleaner 92 can be similar to any of the brewing chamber cleaners 31-31*i*.

With reference to FIGS. 33-40, a brewing chamber cleaner 100 is provided for use with a beverage brewer that has multiple injection nozzles or needles. The brewing chamber cleaner 100 includes a lid 101 having outer and inner surfaces. Preferably, the lid is round, and the inner and outer surfaces are planar and parallel, although the lid can assume any shape. A number of dispersal members 102 are attached to and extend from the inner surface of the lid 101, for example, at a right angle as shown or at any angle suitable to facilitate a desired spray pattern. The dispersal members 102 are, for example, tubular, cylindrical, or frusto-conical, preferably having a round cross-section, each with a sidewall that encloses a hollow interior. Each sidewall terminates at the inner surface of the lid 101 at through-hole 103 in the lid 101, and the other end of each dispersal member 102 has an at least partially closed, preferably blunt surface at the termination of the sidewall to provide backflow pressure of fluid within the dispersal members 102. The through-holes 103 at the ends of the dispersal members 102 provide fluid communication from the outer surface of the lid 101 to the interior of the dispersal members 102, and the dispersal members 102 are preferably sealed against the inner surface of the lid 101 at the through-holes 103. A skirt 104 also extends outward from the inner surface of the lid 101. The skirt 104 has a sidewall that can be uniformly cylindrical, tiered, or tapered at any point along the sidewall.

The sidewalls of the dispersal members 102 include a number of apertures 105 arranged in the distal half of the dispersal members 102, that is, toward the closed end of the dispersal members 102, and can cut into the closed end as shown. Preferably, the apertures 105 are arranged only at the distal half of the dispersal members 102, but any arrangement can be made that provides a desired spray pattern. The apertures 105 allow fluid communication from the hollow interior of the dispersal members 102 to outside the dispersal members 102, such that liquid inside the dispersal members 102 can spray outward. Selective placement, orientation, and shape of the apertures 105 can advantageously direct the spray and affect the intensity of the spray. For example, the apertures 105 can have a cross-section varying in size and/or shape or having a uniform size and/or shape, and can be elongated or compact. The exemplary embodiments shown in the drawing have one row of apertures 105, but the dispersal members 102 can have any number of rows of apertures 105. The apertures 105 need not be arranged in rows at all, and can be distributed on the sidewall in any manner. Preferably, the apertures 105 are sized and shaped to provide a spray that is generally perpendicular to the dispersal member 102 sidewalls and directed to the brewing chamber sidewall. For example, the apertures 105 can have a cross-section that is round, or square, or compacted, or elongated.

The brewing chamber cleaner 100 skirt 104 is configured to guide the brewing chamber cleaner 100 into optimal position above the brewing chamber 29 (see FIG. 2) and to resist or limit lateral movement of the cleaner 100 when in use. The skirt 104 can be tapered or tiered to simplify placement on the brewing chamber 29. The skirt 104 can be sized for a tight fit against a brewing chamber for cleaning or can be sized smaller for general placement of the cleaner 100. If the tighter fit is desired, the skirt 104 can include a seal, for example in the form of a resilient annular ring, to fill any gap between the skirt 104 and the wall of the brewing chamber.

Thus, the brewing chamber cleaner 100 is a beverage brewer spray apparatus that can be used to spray the walls of a beverage brewer in order to rinse residue from the walls and clean the interior of the brewing chamber. Water, heated or not, can be used with the cleaner 100, or cleaning fluid can be used to spray the brewing chamber.

For example, a typical beverage brewer for use with the cleaner 100 includes an injection tube, a brewing chamber configured to receive fluid from the injection tube, and an outflow tube configured to receive fluid from the brewing chamber. During a brewing process, the injection tube receives water, typically heated, and provides the water to the brewing chamber. The brewing chamber typically contains a carrier for ground brewing material, such as a filter pod (or a similar carrier, such as a tea bag), a plastic single-use beverage cartridge (such as a Keurig® K-Cup®), or a reusable beverage material holder (such as any of the Perfect Pod® reusable filter cups). Water from the injection tube passes through the ground beverage material in the carrier to brew the beverage, which then flows out of the brewing chamber through the outflow tube. If the carrier has a closed, water-impermeable surface, the injection tube can be an injection needle with a sharp edge. Likewise, the outflow tube can be an outflow needle having a sharp edge. The cleaner 100 is used in place of the brewing material carrier when cleaning instead of brewing is desired.

The skirt 104 is configured to guide the dispersal members 102 into an open end of the brewing chamber so that the dispersal members 102 are arranged within the interior of the brewing chamber. That is, an outer surface of the skirt and a surface of the interior of the brewing chamber are configured for mutual sliding engagement so that the skirt 104 is removably coupled to the brewing chamber such that the dispersal members 102 are disposed in the interior of the brewing chamber. The skirt 104 can be sized to provide a close fit against the inner sidewall of the brewing chamber, or can be sized for a less close fit so that it facilitates proper placement of the cleaner 100, which can be supported above the brewing chamber by the lid 101. For example, a rim 106 of the lid 101 can extend radially beyond the outer edge of the skirt 104 to support the brewing chamber cleaner 100 above the brewing chamber 29 whether the fit is close or not. The skirt 104 can include scoring to provide a friction fit to the walls of the brewing chamber. That is, the surface of the skirt 104 can have scratches or be otherwise textured to increase the friction of the surface of the skirt 104. Alternatively, the outer surface of the skirt 104 can include a raised portion, such as an annular raised portion, and the surface of the interior of the brewing chamber can include a corresponding recessed portion to provide mutual sliding positive engagement. As another alternative to scoring on the skirt 104 surface, the skirt 104 can include a seal, such as a resilient ring captured in a groove or other sealing arrangement. The scoring and seal shown on other embodiments of the cleaner herein can be applied to this embodiment as well.

The lid through-holes 103 are arranged in the lid so as to be configured to receive ends of the injection tubes, whether sharpened or not, so that the dispersal members 102 receive fluid (water or cleaning fluid) from the injection tubes and disperses the received fluid through the plurality of apertures 105 in the dispersal members 102, aided by the backflow pressure created at the closed portion of the ends of the dispersal members 102. The apertures 105 are sized and oriented to disperse the fluid radially away from the dispersal members 102 and against the sidewall of the brewing chamber so as to clean the brewing chamber sidewall. Some of the apertures 105 can be configured to direct the flow of fluid downward to wash the floor of the brewing chamber, but at least some of the apertures 105 are configured to direct the flow specifically at the brewing chamber sidewall. The dispersal members 102 themselves can also be angled to direct the flow of fluid as desired.

The apertures 105 are configured to provide this direction of flow, for example, by the size, shape, and angle of the aperture 105 within the sidewall of the dispersal members 102. That is, the sidewall of the dispersal members 102 has a thickness, and therefore each aperture 105 has a three-dimensional shape within the dispersal members 102 sidewall. The apertures 105 can all be sized and shaped uniformly, or differently in sets, or independently, with the resulting spray coordinating to produce the desired coverage on the sidewalls of the brewing chamber, as well as on the floor of the brewing chamber if desired. Any or all of the apertures 105 can be cylindrical, with parallel walls and a uniform diameter. Alternatively, any or all of the apertures 105 can vary in cross-section along the length of the aperture, either uniformly in a conical cross-section, or modulating, or undulating (periodically or otherwise). Regardless of shape, any or all of the apertures 105 can be angled in any direction. The combination of the length, shape, and direction of the aperture, as well as the pressure of the fluid in the interior of the dispersal members 102, will dictate the pattern and force of the fluid spray 38 out of the dispersal members 102. The outflow tube is configured to receive the dispersed fluid from the brewing chamber after it has sprayed the brewing chamber and washed down the sidewalls of the brewing chamber.

The cleaner 100 can also be used specifically to clean the outflow tube, as described above with reference to FIGS. 23A, 23B, and 24, using an extraction nozzle cleaner 80 that can include a container made of fluid-impermeable material. In this arrangement, the skirt 104 and the container are configured to mutually engage such that the open proximal end of the container is removably coupled to the skirt 104, preferably such that the lid seals the open proximal end of the container. That is, an outer surface of the skirt 104 and a surface of the interior of the container are configured for mutual sliding engagement so that the container is removably couplable to the skirt 104 such that the dispersal members 102 are disposed in the interior of the container. In this case, the skirt 104 is configured to guide the dispersal members 102 into the open end of the container so that the dispersal members 102 are arranged within the interior of the container.

Preferably, the skirt 104 at least partially encompasses the dispersal members 102. For example, the skirt 104 can form a closed ring or border surrounding the dispersal members 102 to provide contact around the entire periphery of the brewing chamber. Alternatively, the skirt 104 can be made of skirt sections arranged at different locations around the lid, to contact corresponding sections of the periphery of the brewing chamber, with gaps between the sections. For example, the skirt 104 can include two skirt sections arranged opposite each other on the lid, with each section being large enough to secure the lid to the brewing chamber and around the dispersal members 102. It should be apparent that three, four, or any number of skirt sections can make up the skirt 104, as long as they are arranged to secure the lid to the brewing chamber and surround the dispersal members 102. To provide a secure coupling with the brewing chamber or container, the length of the skirt 104 with respect to the length of the dispersal members 102 should also be considered. For example, in some applications it would be advantageous for a distance that the skirt 104 extends outward from the inner surface of the lid to be at least half a distance that the dispersal members 102 extend from the converse surface of the lid, in order to provide secure coupling between the skirt 104 and the brewing chamber or container.

The skirt 104, whether composed of a single piece or multiple sections, should have a length that provides secure contact with the sidewall of the brewing chamber. However, the skirt 104 should not extend lower than the lower end of the longest dispersal member 102, and preferably no lower than the portion of the longest dispersal member 102 that includes the apertures 105. That is, at least the longest dispersal member 102 should extend from the converse surface of the lid a distance that is farther than a distance that the skirt 104 extends from the converse surface of the lid, so that the skirt 104 doesn't block the spray from the apertures 105. Further, the skirt 104 preferably extends from the converse surface of the lid at a substantially right angle, to correspond to the angle of the brewing chamber sidewall. Of course, if the brewing chamber sidewall is angled differently, the angle of the skirt 104 should correspond to that angle.

Because the skirt 104 preferably has a tight fit against the sidewall of the brewing chamber, the leading end of the skirt 104 can taper inward, to facilitate locating the skirt 104 inside the brewing chamber sidewall before pressing down on or screwing in the lid to secure the apparatus. Because the apparatus can be used with various different brewing machines and therefore with brewing chambers having various different sizes, the skirt 104 can be fixed to the converse surface of the lid at a distance from the peripheral edge of the lid such that a peripheral portion of the lid extends beyond an outside surface of the skirt 104, forming a ledge 106 around the skirt 104. Therefore, for larger brewing chambers in which the skirt 104 is not a tight fit, the apparatus can still rest above the brewing chamber, supported by the ledge 106. Also, if the skirt 104 is sized to couple with a container as described above, the apparatus can still be used to clean the brewing chamber when used without the container, again by supporting the apparatus above the brewing chamber on the ledge.

In order for the cleaner 100 to reliably couple with the container (if used), the container sidewall preferably has a substantially uniform height, although this is not necessary, as long as the rim 77 of the container provides a firm surface on which the ledge 106 of the lid 101 can rest, or the inner sidewall of the container provides a firm enough surface to maintain contact with the skirt 104.

When the beverage brewer 10 is operated with cleaning liquid in the water tank 18 (see FIG. 2) and the brewing chamber cleaner 100 in the brewing chamber 29 without the extraction nozzle cleaner 80 attached, the cleaning liquid is sprayed out of the dispersal members 102 against the interior wall of the brewing chamber 29, thus cleaning the brewing chamber 19. When the beverage brewer 10 is operated with cleaning liquid in the water tank 18 (see FIG. 2) and the brewing chamber cleaner 100 in the brewing chamber 29 with the extraction nozzle cleaner 80 attached, the cleaning liquid is sprayed out of the dispersal members 102 and into the extraction nozzle cleaner 80, washing the extraction nozzle 19b as the cleaning liquid flows out of the extraction nozzle cleaner 80 through the extraction nozzle 19b. Thus, in any single cleaning cycle, the brewing chamber 29 or the extraction nozzle 19b can be cleaned, and both can be cleaned if multiple cleaning cycles are performed. The cleaning cycles can be performed in either order, and can be performed any number of times. The cleaning liquid can be just water, either heated or unheated, or can be a cleaning fluid, diluted or undiluted, such as soapy water or a cleaning solvent. If a cleaning fluid is used, a final step is preferably performed using water only to rinse the brewing chamber 29 and extraction nozzle 19b.

As described, the skirt 104 can be sized to facilitate placement of the cleaner 100 within the brewing chamber, or can be sized to provide a close, secure fit with the upper inner sidewall of the brewing chamber. Likewise, the skirt 104 can be sized to facilitate placement of the cleaner 100 within the extraction nozzle cleaner 80, or can be sized to provide a close, secure fit with the upper inner sidewall of the extraction nozzle cleaner 80. In order to provide a close fit of the cleaner 100 with both the brewing chamber and the extraction nozzle cleaner 80, two concentric skirts can be provided, such that the overall skirt is tiered as shown in the drawings. The outer skirt 104 can be sized to facilitate placement of the cleaner 100 within the brewing chamber or to provide a close, secure fit with the upper inner sidewall of the brewing chamber, and the inner skirt 104 can be sized to facilitate placement of the cleaner 100 within the extraction nozzle cleaner 80 or to provide a close, secure fit with the upper inner sidewall of the extraction nozzle cleaner 80. Thus, if desired, the same cleaner 100 can be used for cleaning cycles directed to the brewing chamber or the extraction nozzle cleaner 80, and that cleaner 100 can be used to provide a close, secure fit with each. Instead of including two skirts, the cleaner 100 can include a single skirt 104 having a thickness such that an outer diameter of the skirt 104 is sized to provide a close, secure fit with the upper inner sidewall of the brewing chamber, and an inner diameter of the skirt 104 is sized to provide a close, secure fit with the upper outer sidewall of the brewing chamber extraction nozzle cleaner 80. That is, the outer diameter of the skirt 104 can be sized for engagement with the inner sidewall of the brewing chamber, and the inner diameter of the skirt 104 can be sized for engagement with the outer sidewall of the extraction nozzle cleaner 80, thus providing a single skirt 104 that can be used in either cleaning cycle.

As mentioned above, in this embodiment the lid 101 includes multiple openings 103 that are configured to accommodate the injection nozzle(s) or needle(s) providing water or cleaning fluid for the cleaning process. These openings 103 are simple through-holes that provide access for the nozzles/needles to apertured, for example slotted, dispersion bays 102 as shown, configured to spray the received fluid, or can have any other configuration that accommodates the injection nozzles and sprays the fluid against the interior of the brewing chamber.

Five such openings 103 are shown in the exemplary embodiment, but the openings 103 can be provided in any number, so as to be suitable for use with brewing machines having any number of injection nozzles. Also, the dispersion bays 102 can have uniform configurations, or can be configured differently to accommodate different configurations of injection nozzles or to provide different spray profiles into the brewing chamber. For example the dispersion bays 102 can have different sizes, different shapes, and/or different aperture configurations. For example, the exemplary embodiment shown includes a larger central dispersion bay 102a having a corresponding larger opening 103, and four smaller dispersion bays 102b, having corresponding smaller openings. In this configuration, the larger dispersion bay 102a can accommodate a larger main injection nozzle, and the other dispersion bays 102b can accommodate smaller injection nozzles. One or more of the dispersion bays 102 can be provided that are wide enough to accommodate more than one injection nozzle if desired, or a single opening or bay can be provided that is wide enough to accommodate all of the injection nozzles. Alternatively, an entire portion of the lid 101 can be recessed to accommodate multiple injection nozzles, or all of the injection nozzles, and the recess can include one or more dispersion bays 102 arranged so as to control the spray of water onto the brewing material regardless of the geometrical arrangement of the injection nozzles.

It would be beneficial for the lid 101 to be able to accommodate beverage brewers having a single injection nozzle/needle or any multiple number of injection nozzles/needles, so that a single cleaner 100 can be used with any brewer, regardless of design. In this case, the lid 101 can include multiple openings 103, and the cleaner 100 can be used with brewers having a single injection nozzle/needle, or multiple injection nozzles/needles numbering no more than the number of openings 103, and one or more of the openings 103 can be unused during cleaning. In the embodiment shown, five openings 103 and five corresponding dispersion bays 102 are shown, and therefore this embodiment can be used to clean brewers having five injection nozzles/needles, or brewers having a single injection nozzles/needle, or brewers having two, three, or four injection nozzles/needles. However, it is contemplated that the number and geometric arrangement of the openings 103 and corresponding dispersion bays 102, as well as the size and shape of each opening 103 and corresponding dispersion bay 102, can vary to accommodate any particular beverage brewer, and any such embodiment is intended to be included within the scope of the invention.

The cleaner 100 can, but need not, include plugs that can be removably inserted into any unused openings 103 during the cleaning process, effectively preventing splashing through the unused openings 103. Such plugs should be formed of a resilient, heat-resistant material, such as silicone. The plugs can be inserted into individual unused openings 103 as needed, and can include nubs on the top and/or side to facilitate removal from the openings 103 after use. One or more of these plugs can be tethered to the lid 101, such as to the face or edge of the lid 101, to prevent misplacing the plugs. Alternatively, a number of plugs can be tethered together. For example, a ring of plugs can be provided in any number desired, individual plugs of which can be inserted into selected unused openings 103. If the ring is also formed of a flexible material such as silicone, the ring of plugs can be used regardless of the geometric configuration of unused openings 103, and any unneeded, unused plugs will remain tethered to the ring during the cleaning process. The ring of plugs can be provided separately from the lid 101, or the ring can be tethered to the lid. Thus, the plugs, whether provided individually or as part of a ring, allow for flexibility in use of the beverage brewing cleaner 100, so that a beverage brewing cleaner 100 with a lid 101 having multiple openings 103 can be used with beverage brewers having any number of nozzles/needles without the potential for splashing outside the beverage brewing cleaner 100.

In some cases, a brewer having multiple injection nozzles/needles might not provide adequate liquid pressure at the nozzles/needles to spray through the dispersion bays 102 and against the brewing chamber walls during a cleaning cycle. In such a case, one or more openings 103 and corresponding dispersion bays 102 can be blocked so as not to allow fluid to flow from the corresponding dispersion bays 102, so that more fluid pressure is diverted to the unblocked dispersion bays 102, allowing for a more forceful spray from those dispersion bays 102. In this case, the plugs described above can be hollow, that is, concave, so as to be able to accommodate the nozzle/needle while in the dispersion bays 102 while still preventing fluid from flowing through that dispersion bays 102 into the brewing chamber. Alternatively, the plug can be solid, but include a sheath to closely receive the nozzle/needle to prevent fluid from flowing through that dispersion bay 102 into the brewing chamber, or even to prevent liquid from flowing from that nozzle/needle altogether. As another alternative, the plugs can be solid, having a body made from foam or other penetrable but resilient material so as to firmly hold the nozzle/needle and prevent fluid flow. According to other embodiments, the need for plugs can be avoided by providing some bays that do not have dispersion apertures 105, and instead are merely unperforated recessed regions that accommodate the nozzles/needles but do not allow liquid through the bays and into the brewing chamber. In this case, at least one of the dispersion bays 102 would still have apertures 105 in order to allow for spray from that dispersion bay 102 to clean the brewing chamber.

Regardless of the particular implementation, the blocked nozzles/needles do not provide fluid to the inside of the brewing chamber, allowing the unblocked nozzles/needles to provide fluid at a higher pressure than would otherwise be possible if all nozzles/needles were unblocked. For example, a lid 101 can be provided in which only a central opening includes a dispersion bay 102 having apertures 105, and the other bays are only recessed regions that have no apertures 105. In this case, only the central dispersion bay 102 would provide a spray of fluid against the walls of the brewing chamber in order to clean the chamber. Alternatively, only certain peripheral dispersion bay 102 will have apertures 105 in order to provide spray, or all dispersion bays 102 will have apertures 105 but some dispersion bays 102 will be plugged to prevent fluid spray in the brewing chamber. Any combination of bays having and not having apertures 105 and plugs is contemplated according to the invention in order to optimize the spray pressure against the walls of the brewing chamber.

To be sure that the beverage brewing cleaner 100 aligns properly with the nozzle/needle pattern of a particular brewer, the lid 101 can be keyed to correspond to the brewing chamber or other element of the brewer, so that alignment of the keying elements corresponds to alignment of the nozzles/needles with the openings 103. For example, elements of the beverage brewing cleaner 100 and/or brewer can be notched and/or can include corresponding ears to ensure proper rotational orientation of the beverage brewing cleaner 100 in the brewing chamber when arranged for the brewing process, so that the openings 103, with or without plugs, align properly with the nozzles/needles. With or without keying, the lid 101 can include an indicator 107, that is, a marking such as an arrow or pointer, to indicate alignment for a user. The cleaner 100 can also include one or more handles or ears 108 on the sides or top of the lid that are graspable to facilitate placement and removal of the cleaner 100 on the brewing chamber 29 or extraction nozzle cleaner 80. These ears can include a latching element that mates with a corresponding latching element on the brewing chamber 29 or extraction nozzle cleaner 80 to provide a secure fit absent scoring, sealing, or other mating features.

In use, beverage brewing cleaner 100 can be placed above the brewing chamber 29 of a beverage brewer, either supported on the upper edge of the brewing chamber 29 by the ledge 106, or fitted to the inner wall of the brewing chamber 29 by the skirt 104. When the brewer is actuated, injection needles or nozzles will be received by one or more of the lid openings 103 and will inject water or cleaning fluid against the walls of the brewing chamber 29, directed by the dispersion bays 102, thereby cleaning the brewing chamber 29. The water or cleaning fluid will then flow out of the brewing chamber 29 through the outflow needle or nozzle of the brewer and eventually into a container for disposal. Alternatively, the cleaner 100 will couple with an extraction nozzle cleaner 80 prior to placement within the brewing chamber 29, so that the water or cleaning fluid will flow through the outflow needle or nozzle of the brewer without spraying the brewing chamber walls, thereby cleaning the outflow needle or nozzle of the brewer.

The invention has been described by way of example and in terms of preferred embodiments. However, the invention as contemplated by the inventor is not strictly limited to the particularly disclosed embodiments. To the contrary, various modifications, as well as similar arrangements, are included within the spirit and scope of the invention. The invention, therefore, should be accorded the broadest reasonable interpretation so as to encompass all such modifications and similar arrangements.

I claim:

1. A beverage brewer spray apparatus, comprising:

a lid, wherein the lid has a plurality of through-holes;

a dispersion bay extending from a surface of the lid at an open proximal end of the dispersion bay; and at least one closed bay extending from at least another one of the plurality of through-holes at an open proximal end of the closed bay;

wherein the dispersion bay has a sidewall and a distal end together defining an interior of the dispersion bay, wherein the sidewall has a plurality of apertures formed therethrough;

wherein the dispersion bay extends from one of the plurality of through-holes; and wherein the at least one closed bay has a closed sidewall and a closed distal end together defining an interior of the at least one closed bay.

2. The beverage brewer spray apparatus of claim 1, wherein the plurality of through-holes is five through-holes.

3. The beverage brewer spray apparatus of claim 2, wherein the at least one closed bay is four closed bays.

4. The beverage brewer spray apparatus of claim 1, further comprising at least one plug configured to close off at least another one of the plurality of through-holes.

5. The beverage brewer spray apparatus of claim 4, wherein the at least one plug is a plurality of plugs.

6. The beverage brewer spray apparatus of claim 5, wherein the at least one plug is four plugs.

7. The beverage brewer spray apparatus of claim 5, wherein the plurality of plugs is tethered together.

8. The beverage brewer spray apparatus of claim 5, wherein the plurality of plugs is tethered to the lid.

* * * * *